US011090681B2

(12) United States Patent
Zook et al.

(10) Patent No.: US 11,090,681 B2
(45) Date of Patent: Aug. 17, 2021

(54) COMPOSITION INCLUDING A POLYTHIOL, A POLYEPOXIDE, A PHOTOLATENT BASE, AND AN AMINE AND METHODS RELATING TO THE COMPOSITION

(71) Applicant: 3M INNOVATIVE PROPERTIES COMPANY, St. Paul, MN (US)

(72) Inventors: Jonathan D. Zook, Stillwater, MN (US); Sheng Ye, Redmond, WA (US); Erik M. Townsend, South Saint Paul, MN (US); Michael D. Swan, Lake Elmo, MN (US); William H. Moser, Edina, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 94 days.

(21) Appl. No.: 16/347,417

(22) PCT Filed: Nov. 2, 2017

(86) PCT No.: PCT/US2017/059726
§ 371 (c)(1),
(2) Date: May 3, 2019

(87) PCT Pub. No.: WO2018/085546
PCT Pub. Date: May 11, 2018

(65) Prior Publication Data
US 2019/0276588 A1 Sep. 12, 2019

Related U.S. Application Data

(60) Provisional application No. 62/416,970, filed on Nov. 3, 2016, provisional application No. 62/416,948, filed on Nov. 3, 2016.

(51) Int. Cl.
| | | |
|---|---|---|
| C08G 59/56 | (2006.01) | |
| B05D 1/02 | (2006.01) | |
| C09D 7/63 | (2018.01) | |
| B05D 3/06 | (2006.01) | |
| C08G 59/40 | (2006.01) | |
| C08K 5/05 | (2006.01) | |
| C08K 5/5415 | (2006.01) | |
| C09D 5/00 | (2006.01) | |
| C09D 5/34 | (2006.01) | |
| C08G 59/32 | (2006.01) | |
| C08G 59/50 | (2006.01) | |
| C09K 3/10 | (2006.01) | |
| C09D 163/00 | (2006.01) | |
| C09D 181/00 | (2006.01) | |
| B05D 3/10 | (2006.01) | |

(52) U.S. Cl.
CPC ............ *B05D 1/02* (2013.01); *B05D 3/06* (2013.01); *C08G 59/32* (2013.01); *C08G 59/4064* (2013.01); *C08G 59/5013* (2013.01); *C08G 59/56* (2013.01); *C08K 5/05* (2013.01); *C08K 5/5415* (2013.01); *C09D 5/002* (2013.01); *C09D 5/34* (2013.01); *C09D 7/63* (2018.01); *C09K 3/10* (2013.01); *B05D 3/107* (2013.01); *C09D 163/00* (2013.01); *C09D 181/00* (2013.01); *C09K 2200/0682* (2013.01)

(58) Field of Classification Search
CPC .. C09K 2200/0682; C09K 3/10; C08G 59/56; C08G 59/686; C08G 59/66; C08G 59/5103; C08G 59/49064; C08G 59/32; B05D 3/107; B05D 3/06
USPC ..................................................... 522/170
See application file for complete search history.

(56) References Cited

U.S. PATENT DOCUMENTS

| | | | |
|---|---|---|---|
| 2,466,963 A | 4/1949 | Patrick | |
| 2,789,958 A | 4/1957 | Fettes | |
| 2,800,457 A | 7/1957 | Green | |
| 2,800,458 A | 7/1957 | Green | |
| 3,225,017 A | 12/1965 | Seegman | |
| 3,991,039 A | 11/1976 | Gunter | |
| 4,165,425 A | 8/1979 | Bertozzi | |
| 4,366,307 A | 12/1982 | Singh | |
| 4,609,762 A | 9/1986 | Morris | |
| 4,894,314 A | 1/1990 | Barr | |
| 4,943,516 A | 7/1990 | Kamayachi | |
| 4,948,694 A | 8/1990 | Ohkuma | |
| 5,225,472 A | 7/1993 | Cameron | |

(Continued)

FOREIGN PATENT DOCUMENTS

| | | |
|---|---|---|
| JP | S59-129221 | 7/1984 |
| JP | 2009-126974 | 6/2009 |

(Continued)

OTHER PUBLICATIONS

Blickenstorfer, "Adhesive curing on demand" Paint & Coatings Industry Publication, Nov. 2009, [retrieved from the internet on Dec. 13, 2017], URL <https://www.pcimag.com/articles/89792-adhesive-curing-on-demand?>, pp. 8.
Ciba. "Photoinitiatros for UV Curing: Key products selection Guide 2003". Ciba Specialty Chemicals. Available online at https:// people.rit.edu/deeemc/reference_13/Imprint/Photoinitiators%20for%20UV%20curing.pdf. Evidentiary reference. (Year: 2003), 8 pages.
CRC Handbook, 91st Edition, "Dissociation Constants of Organic Acids and Bases", Available online at https://sites.chem.colostate.edu/diverdi/all_courses/CRC%20reference%20data/dissociation%20constants%20of%20organic%20acids%20and%20bases.pdf. Evidentiary reference. (Year: 2010). pp. 8-42-8-51.

(Continued)

*Primary Examiner* — Sanza L. McClendon
(74) *Attorney, Agent, or Firm* — Kathleen B. Gross

(57) ABSTRACT

A composition including a polythiol having more than one thiol groups, a polyepoxide having more than one epoxide group, a photolatent base catalyst that can photochemically generate a first amine, and a second amine phase-separated within the composition. A polymer network preparable from the composition, and a method for making the polymer network are also disclosed.

20 Claims, No Drawings

(56) References Cited

U.S. PATENT DOCUMENTS

| | | | |
|---|---|---|---|
| 5,271,881 A | 12/1993 | Redding, Jr. | |
| 5,409,985 A | 4/1995 | Robinson | |
| 5,430,112 A | 7/1995 | Sakata | |
| 5,610,243 A | 3/1997 | Vietti | |
| 5,912,319 A | 6/1999 | Zook | |
| 5,959,071 A | 9/1999 | DeMoss | |
| 6,057,380 A * | 5/2000 | Birbaum | G03F 7/038 522/8 |
| 6,087,070 A | 7/2000 | Turner | |
| 6,124,371 A | 9/2000 | Stanssens | |
| 6,172,179 B1 | 1/2001 | Zook | |
| 6,410,628 B1 | 6/2002 | Hall-Goulle | |
| 6,509,418 B1 | 1/2003 | Zook | |
| 7,538,104 B2 | 5/2009 | Baudin | |
| 7,923,113 B2 | 4/2011 | Dogan | |
| 7,927,538 B2 | 4/2011 | Moszner | |
| 8,003,169 B2 | 8/2011 | Misev | |
| 9,297,940 B2 | 3/2016 | Shin | |
| 9,616,460 B2 | 4/2017 | Templeman | |
| 9,637,666 B2 | 5/2017 | Kitano | |
| 9,714,317 B2 | 7/2017 | Li | |
| 10,072,135 B2 | 9/2018 | Ye | |
| 10,526,440 B2 | 1/2020 | Zook | |
| 10,703,906 B2 | 7/2020 | Ye | |
| 10,858,558 B2 | 12/2020 | Townsend | |
| 2004/0158023 A1 | 8/2004 | Hwang | |
| 2004/0247792 A1 | 12/2004 | Sawant | |
| 2006/0175005 A1 | 8/2006 | Sawant | |
| 2006/0293403 A1 | 12/2006 | Hubert | |
| 2007/0173602 A1 | 7/2007 | Brinkman | |
| 2007/0202341 A1 | 8/2007 | Dogan | |
| 2007/0249484 A1 | 10/2007 | Benkhoff | |
| 2011/0190412 A1 | 8/2011 | Studer | |
| 2012/0040103 A1 | 2/2012 | Kelediian | |
| 2013/0345389 A1 | 12/2013 | Cai | |
| 2014/0110881 A1 | 4/2014 | Keledjian | |
| 2015/0065600 A1 | 3/2015 | Ye | |
| 2015/0252233 A1 | 9/2015 | Anderson | |
| 2016/0032058 A1 | 2/2016 | Ye | |
| 2016/0032059 A1 | 2/2016 | Ye | |
| 2016/0090507 A1 | 3/2016 | Keledjian | |
| 2016/0160080 A1 | 6/2016 | Cai | |
| 2016/0355645 A1 | 12/2016 | Martin | |
| 2017/0174823 A1 | 6/2017 | Weippert | |
| 2018/0030322 A1 | 2/2018 | Bons | |
| 2018/0127538 A1* | 5/2018 | Ye | C08G 75/02 |

FOREIGN PATENT DOCUMENTS

| | | | |
|---|---|---|---|
| JP | 2010-095686 | 4/2010 | |
| JP | 2013-087149 | 5/2013 | |
| JP | 2014-133875 | 7/2014 | |
| JP | 2014-141419 | 8/2014 | |
| WO | WO 2008/088770 | 7/2008 | |
| WO | WO 2013/153047 | 10/2013 | |
| WO | WO 2014/164244 | 10/2014 | |
| WO | WO 2014/172305 | 10/2014 | |
| WO | WO 2014/176490 | 10/2014 | |
| WO | WO 2016/128547 | 8/2016 | |
| WO | WO-2016176548 A1 * | 11/2016 | C08G 59/66 |
| WO | WO 2018/085534 | 5/2018 | |
| WO | WO 2018/085550 | 5/2018 | |
| WO | WO 2018/227149 | 12/2018 | |

OTHER PUBLICATIONS

Kiniro, "Aminimides Derived From p-Substituted Benzoylformic Acid Ester as Thermal/Photolatent Bases and Photoradical Initiators", *Journal of Polymer Science, Part A: Polymer Chemistry*, Jul. 2013, vol. 51, pp. 4292-4300.

PubChem Compound Summary for CID 7064, National Center for Biotechnology Information, PubChem Compound Database; CID=7064, https://pubchemncbi.nlm.nih.gov/compound/Benzoguanamine#section=Bioconcentration (accessed Jan. 3, 2019) Evidentiary reference.  (Year: 2019).

Salmi, "Quaternary Ammonium Salts of Phenylglyoxylic Acid as Photobase Generators for Thiol-Promoted Epoxide Photopolymerization", *Polymer Chemistry*, Jul. 2014, vol. 5, pp. 6577-6583.

Sangermano, "Photolatent Amines Producing a Strong Base as Photocatalyst for the in-situ Preparation of Organic—Inorganic Hybrid Coatings", *Polymer*, Apr. 2014, vol. 55, No. 7, pp. 1628-1635.

Suyama, "Photobase Generators: Recent Progress and Application Trend in Polymer Systems", *Progress in Polymer Science*, 2009, vol. 34, pp. 194-209.

Specht, "Ketocoumarins: A new class of triplet sensitizers", *Tetrahedron*, vol. 38, No. 9, pp. 1203-1211 (1982).

"Adhesive curing on demand" in www.pcimag.com Nov. 2009 by BASF, pp. 28-32.

Teshima, "ESR study of camphorquinone/amine photoinitiator systems using blue light-emitting diodes", *Biomaterials*, vol. 24, pp. 2097-2103 (2003).

International Search Report for PCT International Application No. PCT/US2017/059726, dated Apr. 19, 2018, 6 pages.

* cited by examiner

COMPOSITION INCLUDING A POLYTHIOL, A POLYEPOXIDE, A PHOTOLATENT BASE, AND AN AMINE AND METHODS RELATING TO THE COMPOSITION

CROSS-REFERENCE TO RELATED APPLICATION

This application is a national stage filing under 35 U.S.C. 371 of PCT/US2017/059726, filed Nov. 2, 2017, which claims priority to U.S. Provisional Application Nos. 62/416,970 and 62/416,948, filed Nov. 3, 2016, the disclosures of which are incorporated by reference in their entirety herein.

BACKGROUND

Sulfur-containing polymers are known to be well-suited for use in aerospace sealants due to their fuel resistant nature upon crosslinking. Such crosslinking can be carried out, for example, by reaction of a thiol-terminated sulfur-containing compound with an epoxy resin, generally in the presence of an amine accelerator as described in U.S. Pat. No. 5,912,319 (Zook et al.). A desirable combination of properties for aerospace sealants, which is difficult to obtain, is the combination of long application time (i.e., the time during which the sealant remains usable) and short curing time (the time required to reach a predetermined strength).

The use of waxy polymers for encapsulation of amine catalysts used in Michael addition compositions is disclosed in U.S. Application Publication Nos. 2007/0173602 (Brinkman) and 2013/0345389 (Cai et al.).

In other technologies, photochemical generation of bases may be useful for a variety of polymerization reactions. For example, photochemically generated bases may be useful for catalyzing epoxide homopolymerization, Michael additions, and thiol- or polyol-isocyanate reactions. Japanese Patent Application Publication JP2009-126974 describes a thiol-epoxide reaction catalyzed by a photogenerated base.

SUMMARY

Compositions and methods according to the present disclosure include a polythiol, a polyepoxide, and two catalysts. One catalyst is a photolatent base suitable for photochemically curing the composition by generating an amine. The second catalyst is a second amine that is phase-separated from the composition but is suitable for curing the composition, for example, at elevated temperature. The photolatent base provides a cure-on-demand feature to the composition according the present disclosure when the composition is exposed to a light trigger, for example, to provide at least a non-tacky surface or, in some cases, to fully cure the composition. The presence of the second amine in the composition provides several advantages. The second amine can decrease the time to fully cure the composition, for example, once the light source is removed. This can be accomplished by increasing the temperature of the composition. In some cases, exposure of the composition to a light trigger results in the heating of the composition to an extent that the second amine is thermally triggered. In some embodiments, a third amine is added. The third amine can provide the composition with a backup curing mechanism at ambient temperature and ensures curing in cases in which photochemical irradiation is not an option, does not reach the entire composition (e.g., in unexposed areas), or is inadvertently omitted. As shown in the Examples, below, the second amine does not interfere with the photochemical cure using the photolatent base, and the presence of the photolatent base does not interfere with the cure provided by the second amine. Compositions including photolatent base, the second amine phase-separated within the composition, and third amine can be cured into polymer networks having similar properties using light alone, light and heat, heat alone, or dark/ambient conditions (see, e.g., Table 2). Thus, the composition can be useful, for example, as a one-part or two-part sealant composition with independent photochemical and thermal cure-on-demand options.

In one aspect, the present disclosure provides a composition that includes a polythiol having more than one thiol group, a polyepoxide having more than one epoxide group, a photolatent base that can photochemically generate a first amine, and a second amine that is phase-separated within the composition. In some embodiments, the composition includes a third amine that is not phase-separated.

In another aspect, the present disclosure provides a polymer network preparable from the composition described above, in which at least some of the thiol groups and epoxide groups have reacted to form thioether groups and hydroxyl groups.

In another aspect, the present disclosure provides a method of making a polymer network. The method includes providing the composition described above and at least one of exposing the composition to light to generate the first amine to at least partially cure the composition or allowing the composition to achieve a temperature sufficient to at least partially cure the composition.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The terms "cure" and "curable" refer to joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility, but may be swellable in the presence of an appropriate solvent.

The term "polymer or polymeric" will be understood to include polymers, copolymers (e.g., polymers formed using two or more different monomers), oligomers or monomers that can form polymers, and combinations thereof, as well as polymers, oligomers, monomers, or copolymers that can be blended.

"Alkyl group" and the prefix "alk-" are inclusive of both straight chain and branched chain groups and of cyclic groups. In some embodiments, alkyl groups have up to 30 carbons (in some embodiments, up to 20, 15, 12, 10, 8, 7, 6, or 5 carbons) unless otherwise specified. Cyclic groups can be monocyclic or polycyclic and, in some embodiments, have from 3 to 10 ring carbon atoms. Terminal "alkenyl" groups have at least 3 carbon atoms.

"Alkylene" is the multivalent (e.g., divalent or trivalent) form of the "alkyl" groups defined above.

"Arylalkylene" refers to an "alkylene" moiety to which an aryl group is attached. "Alkylarylene" refers to an "arylene" moiety to which an alkyl group is attached.

The terms "aryl" and "arylene" as used herein include carbocyclic aromatic rings or ring systems, for example, having 1, 2, or 3 rings and optionally containing at least one heteroatom (e.g., O, S, or N) in the ring optionally substituted by up to five substituents including one or more alkyl groups having up to 4 carbon atoms (e.g., methyl or ethyl), alkoxy having up to 4 carbon atoms, halo (i.e., fluoro, chloro, bromo or iodo), hydroxy, or nitro groups. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

All numerical ranges are inclusive of their endpoints and non-integral values between the endpoints unless otherwise stated (e.g., 1 to 5 includes 1, 1.5, 2, 2.75, 3, 3.80, 4, 5, etc.).

DETAILED DESCRIPTION

Existing sealant products now in use in the aircraft industry are typically either two-part products or one-part products. For the two-part products, once the user mixes the two parts, the reaction begins and the sealant starts to form into an elastomeric solid. After mixing, the time that the sealant remains usable is called the application life or open time. Throughout the application life, viscosity of the sealant gradually increases until the sealant is too viscous to be applied. Application life and cure time are typically related in that short-application-life products cure quickly. Conversely, long-application-life products cure slowly. In practice, customers choose products with differing application lives and cure times depending on the specific application. This requires the customer to maintain inventories of multiple products to address the production flow requirements of building and repairing aircraft. For one-part products, users can avoid a complicated mixing step, but the product has to be shipped and stored in a freezer before application. Advantageously, in many embodiments, compositions according to the present disclosure can be useful as one-part sealants that can simultaneously have a long application life but can be cured on demand.

Polythiols and polyepoxides useful for practicing the present disclosure have more than one thiol group and epoxide group, respectively. In some embodiments, the polythiol includes at least two thiol groups, and the polyepoxide includes at least two epoxide groups. Generally, in order to achieve chemical crosslinking between polymer chains, greater than two thiol groups and/or greater than two epoxide groups are present in at least some of the polythiol and polyepoxide molecules, respectively. When using a polythiol having two thiol groups, for example, a mixture of polyepoxides may be useful in which at least one polyepoxide has two epoxide groups, and at least one polyepoxide has at least three epoxide groups. Mixtures of polyepoxides and/or polythiols having at least 5 percent functional equivalents of epoxide groups contributed by polyepoxides having at least three epoxide groups or thiol groups contributed by polythiols having at least three thiol groups may be useful.

A variety of polythiols having more than one thiol group and polyepoxides having more than one epoxide group are useful in the composition according to the present disclosure. In some embodiments, the polythiol is monomeric. In these embodiments, the polythiol may be an alkylene, arylene, alkylarylene, arylalkylene, or alkylenearylalkylene having at least two mercapto groups, wherein any of the alkylene, alkylarylene, arylalkylene, or alkylenearylalkylene are optionally interrupted by one or more ether (i.e., —O—), thioether (i.e., —S—), or amine (i.e., —NR$^1$—) groups and optionally substituted by alkoxy or hydroxyl. Useful monomeric polythiols may be dithiols or polythiols with more than 2 (in some embodiments, 3 or 4) mercaptan groups. In some embodiments, the polythiol is an alkylene dithiol in which the alkylene is optionally interrupted by one or more ether (i.e., —O—) or thioether (i.e., —S—) groups. Examples of useful dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane and mixtures thereof. Examples of polythiols having more than two mercaptan groups include propane-1,2,3-trithiol; 1,2-bis[(2-mercaptoethyl)thio]-3-mercaptopropane; tetrakis(7-mercapto-2,5-dithiaheptyl)methane; and trithiocyanuric acid. Combinations of any of these or with any of the dithiols mentioned above may be useful.

In some embodiments, the polythiol in the curable composition according to the present disclosure is oligomeric or polymeric. Examples of useful oligomeric or polymeric polythiols include polythioethers and polysulfides. Polythioethers include thioether linkages (i.e., —S—) in their backbone structures. Polysulfides include disulfide linkages (i.e., —S—S—) in their backbone structures.

Polythioethers can be prepared, for example, by reacting dithiols with dienes, diynes, divinyl ethers, diallyl ethers, ene-ynes, or combinations of these under free-radical conditions. Useful dithiols include any of the dithiols listed above. Examples of suitable divinyl ethers include divinyl ether, ethylene glycol divinyl ether, butanediol divinyl ether, hexanediol divinyl ether, diethylene glycol divinyl ether, triethylene glycol divinyl ether, tetraethylene glycol divinyl ether, cyclohexanedimethanol divinyl ether, polytetrahydrofuryl divinyl ether, and combinations of any of these. Useful divinyl ethers of formula $CH_2$=CH—O—(~$R^2$—O—)$_m$—CH=$CH_2$, in which m is a number from 0 to 10 and $R^2$ is a $C_2$ to $C_6$ branched alkylene can be prepared by reacting a polyhydroxy compound with acetylene. Examples of compounds of this type include compounds in which $R^2$ is an alkyl-substituted methylene group such as —CH($CH_3$)— (e.g., those obtained from BASF, Florham Park, N.J., under the trade designation "PLURIOL", for which $R^2$ is ethylene and m is 3.8) or an alkyl-substituted ethylene (e.g., —$CH_2$CH($CH_3$)— such as those obtained from International Specialty Products of Wayne, N.J., under the trade designation "DPE" (e.g., "DPE-2" and "DPE-3"). Examples of other suitable dienes, diynes, and diallyl ethers include 4-vinyl-1-cyclohexene, 1,5-cyclooctadiene, 1,6-heptadiyne, 1,7-octadiyne, and diallyl phthalate. Small amounts trifunctional compounds (e.g., triallyl-1,3,5-triazine-2,4,6-trione, 2,4,6-triallyloxy-1,3,5-triazine) may also be useful in the preparation of oligomers.

Examples of oligomeric or polymeric polythioethers useful for practicing the present disclosure are described, for example, in U.S. Pat. No. 4,366,307 (Singh et al.), U.S. Pat. No. 4,609,762 (Morris et al.), U.S. Pat. No. 5,225,472 (Cameron et al.), U.S. Pat. No. 5,912,319 (Zook et al.), U.S. Pat. No. 5,959,071 (DeMoss et al.), U.S. Pat. No. 6,172,179 (Zook et al.), and U.S. Pat. No. 6,509,418 (Zook et al.). In some embodiments, the polythioether is represented by formula HS—$R^3$—[S—($CH_2$)$_2$—O—[—$R^4$—O—]$_m$—($CH_2$)$_2$—S—$R^3$—]$_n$—SH, wherein each $R^3$ and $R^4$ is independently a $C_{2-6}$ alkylene, wherein alkylene may be straight-chain or branched, $C_{6-8}$ cycloalkylene, $C_{6-10}$ alkylcycloalkylene, —[(CH$_2$—)$_p$—X—]$_q$—(~CH$_2$—)$_r$, in which at least one —CH$_2$— is optionally substituted with a methyl group, X is selected from the group consisting of O, S and —NR$^5$—, R$^5$ denotes hydrogen or methyl, m is a number from 0 to 10, n is a number from 1 to 60, p is an integer from 2 to 6, q is an integer from 1 to 5, and r is an integer from 2 to 10. Polythioethers with more than two mercaptan groups may also be useful.

In some embodiments, a free-radical initiator is combined with the dithiols with dienes, diynes, divinyl ethers, diallyl ethers, ene-ynes, or combinations of these, and the resulting mixture is heated to provide the polythioethers. Examples of suitable free-radical initiators include azo compounds (e.g., 2,2'-azobisisobutyronitrile (AIBN), 2,2'-azobis(2-methylbutyronitrile), or azo-2-cyanovaleric acid). In some embodiments, the free-radical initiator is an organic peroxide. Examples of useful organic peroxides include hydroperoxides (e.g., cumene, tert-butyl or tert-amyl hydroperoxide), dialkyl peroxides (e.g., di-tert-butylperoxide, dicumylperoxide, or cyclohexyl peroxide), peroxyesters (e.g., tert-butyl perbenzoate, tert-butyl peroxy-2-ethylhexanoate, tert-butyl peroxy-3,5,5-trimethylhexanoate, tert-butyl monoperoxymaleate, or di-tert-butyl peroxyphthalate), peroxycarbonates (e.g., tert-butylperoxy 2-ethylhexylcarbonate, tert-butylperoxy isopropyl carbonate, or di(4-tert-butylcyclohexyl) peroxydicarbonate), ketone peroxides (e.g., methyl ethyl ketone peroxide, 1,1-di(tert-butylperoxy)cyclohexane, 1,1-di(tert-butylperoxy)-3,3,5-trimethylcyclohexane, and cyclohexanone peroxide), and diacylperoxides (e.g., benzoyl peroxide or lauryl peroxide). The organic peroxide may be selected, for example, based on the temperature desired for use of the organic peroxide and compatibility with the monomers. Combinations of two or more organic peroxides may also be useful.

The free-radical initiator useful for making a polythioether may also be a photoinitiator. Examples of useful photoinitiators include benzoin ethers (e.g., benzoin methyl ether or benzoin butyl ether); acetophenone derivatives (e.g., 2,2-dimethoxy-2-phenylacetophenone or 2,2-diethoxyacetophenone); 1-hydroxycyclohexyl phenyl ketone; and acylphosphine oxide derivatives and acylphosphonate derivatives (e.g., bis(2,4,6-trimethylbenzoyl)phenylphosphine oxide, diphenyl-2,4,6-trimethylbenzoylphosphine oxide, isopropoxyphenyl-2,4,6-trimethylbenzoylphosphine oxide, or dimethyl pivaloylphosphonate). Many photoinitiators are available, for example, from BASF under the trade designation "IRGACURE". The photoinitiator may be selected, for example, based on the desired wavelength for curing and compatibility with the monomers. When using a photoinitiator, the polythioether is typically prepared using an actinic light source (e.g., at least one of a blue light source or a UV light source).

Polythioethers can also be prepared, for example, by reacting dithiols with diepoxides, which may be carried out by stirring at room temperature, optionally in the presence of a tertiary amine catalyst (e.g., 1,4-diazabicyclo[2.2.2]octane (DABCO)). Useful dithiols include any of those described above. Useful epoxides can be any of those having two epoxide groups. In some embodiments, the diepoxide is a bisphenol diglycidyl ether, wherein the bisphenol (i.e., —O—C$_6$H$_5$—CH$_2$—C$_6$H$_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl. Polythioethers prepared from dithiols and diepoxides have pendent hydroxyl groups and can have structural repeating units represented by formula —S—R$^3$—S—CH$_2$—CH(OH)—CH$_2$—O—C$_6$H$_5$—CH$_2$—C$_6$H$_5$—O—CH$_2$—CH(OH)—CH$_2$—S—R$^3$—S—, wherein R$^3$ is as defined above, and the bisphenol (i.e., —O—C$_6$H$_5$—CH$_2$—C$_6$H$_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl. Mercaptan terminated polythioethers of this type can also be reacted with any of the dienes, diynes, divinyl ethers, diallyl ethers, and ene-ynes listed above under free radical conditions. Any of the free-radical initiators and methods described above may be useful for preparing the polythioethers. In some embodiments, the thermal initiators described above are used, and the resulting mixture is heated to provide the polythioethers.

Polysulfides are typically prepared by the condensation of sodium polysulfide with bis-(2-chloroethyl) formal, which provides linear polysulfides having two terminal mercaptan groups. Branched polysulfides having three or more mercaptan groups can be prepared using trichloropropane in the reaction mixture. Examples of useful polysulfides are described, for example, in U.S. Pat. No. 2,466,963 (Patrick et al); U.S. Pat. No. 2,789,958 (Fettes et al); U.S. Pat. No. 4,165,425 (Bertozzi); and U.S. Pat. No. 5,610,243 (Vietti et al.). Polysulfides are commercially available under the trademarks "THIOKOL" and "LP" from Toray Fine Chemicals Co., Ltd., Urayasu, Japan and are exemplified by grades "LP-2", "LP-2C" (branched), "LP-3", "LP-33", and "LP-541".

Polythioethers and polysulfides can have a variety of useful molecular weights. In some embodiments, the polythioethers and polysulfides have number average molecular weights in a range from 500 grams per mole to 20,000 grams per mole, 1,000 grams per mole to 10,000 grams per mole, or 2,000 grams per mole to 5,000 grams per mole.

A variety of polyepoxides having more than one epoxide group are useful in the composition according to the present disclosure. In some embodiments, the polyepoxide is monomeric. In some embodiments, the polyepoxide is oligomeric or polymeric (that is, an epoxy resin). A monomeric polyepoxide may be an alkylene, arylene, alkylarylene, arylalkylene, or alkylenearylalkylene having at least two epoxide groups, wherein any of the alkylene, alkylarylene, arylalkylene, or alkylenearylalkylene are optionally interrupted by one or more ether (i.e., —O—), thioether (i.e., —S—), or amine (i.e., —NR$^1$—) groups and optionally substituted by alkoxy, hydroxyl, or halogen (e.g., fluoro, chloro, bromo, iodo). Useful monomeric polyepoxides may be diepoxides or polyepoxides with more than 2 (in some embodiments, 3 or 4) epoxide groups. An epoxy resin may be prepared by chain-extending any of such polyepoxides.

Some useful polyepoxides are aromatic. Useful aromatic polyepoxides and epoxy resins typically contain at least one (in some embodiments, at least 2, in some embodiments, in a range from 1 to 4) aromatic ring (e.g., phenyl group) that is optionally substituted by a halogen (e.g., fluoro, chloro, bromo, iodo), alkyl having 1 to 4 carbon atoms (e.g., methyl or ethyl), or hydroxyalkyl having 1 to 4 carbon atoms (e.g., hydroxymethyl). For polyepoxides and epoxy resin repeating units containing two or more aromatic rings, the rings may be connected, for example, by a branched or straight-chain alkylene group having 1 to 4 carbon atoms that may optionally be substituted by halogen (e.g., fluoro, chloro, bromo, iodo). In some embodiments, the aromatic polyepoxide or epoxy resin is a novolac. In these embodiments, the novolac epoxy may be a phenol novolac, an ortho-, meta-, or para-cresol novolac, or a combination thereof. In some embodiments, the aromatic polyepoxide or epoxy resin is a bisphenol diglycidyl ether, wherein the bisphenol (i.e., —O—$C_6H_5$—$CH_2$—$C_6H_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl. In some embodiments, the polyepoxide is a novolac epoxy resin (e.g., phenol novolacs, ortho-, meta-, or para-cresol novolacs or combinations thereof), a bisphenol epoxy resin (e.g., bisphenol A, bisphenol F, halogenated bisphenol epoxies, and combinations thereof), a resorcinol epoxy resin, and combinations of any of these. Examples of useful aromatic monomeric polyepoxides include the diglycidyl ethers of bisphenol A and bisphenol F and tetrakis glycidyl-4-phenylolethane and mixtures thereof.

Some useful polyepoxides are non-aromatic. The non-aromatic epoxy can include a branched or straight-chain alkylene group having 1 to 20 carbon atoms optionally interrupted with at least one —O— and optionally substituted by hydroxyl. In some embodiments, the non-aromatic epoxy can include a poly(oxyalkylene) group having a plurality (x) of oxyalkylene groups, $OR^1$, wherein each $R^1$ is independently $C_2$ to $C_5$ alkylene, in some embodiments, $C_2$ to $C_3$ alkylene, x is 2 to about 6, 2 to 5, 2 to 4, or 2 to 3. Examples of useful non-aromatic monomeric polyepoxides include ethylene glycol diglycidyl ether, propylene glycol diglycidyl ether, diethylene glycol diglycidyl ether, dipropylene glycol diglycidyl ether, polyethylene glycol diglycidyl ether, polypropylene glycol diglycidyl ether, glycerol diglycidyl ether, propanediol diglycidyl ether, butanediol diglycidyl ether, and hexanediol diglycidyl ether. Examples of useful polyepoxides having more than two epoxide groups include glycerol triglycidyl ether, and polyglycidyl ethers of 1,1,1-trimethylolpropane, pentaerythritol, and sorbitol. Other examples of useful polyepoxides include glycidyl ethers of cycloaliphatic alcohols (e.g., 1,4-cyclohexanedimethanol, bis(4-hydroxycyclohexyl)methane or 2,2-bis(4-hydroxycyclohexyl)propane), cycloaliphatic epoxy resins (e.g., bis(2,3-epoxycyclopentyl) ether, 2,3-epoxycyclopentyl glycidyl ether, 1,2-bis(2,3-epoxycyclopentyloxy)ethane and 3,4-epoxycyclohexylmethyl 3',4'-epoxycyclohexanecarboxylate), and hydantoin diepoxide. Examples of polyepoxides having amine groups include poly(N-glycidyl) compounds obtainable by dehydrochlorinating the reaction products of epichlorohydrin with amines containing at least two amine hydrogen atoms. These amines are, for example, aniline, n-butylamine, bis(4-aminophenyl) methane, m-xylylenediamine or bis(4-methylaminophenyl) methane. Examples of polyepoxides having thioether groups include di-S-glycidyl derivatives of dithiols (e.g., ethane-1, 2-dithiol or bis(4-mercaptomethylphenyl) ether).

In some embodiments of compositions according to the present disclosure and/or useful in the methods according to the present disclosure, the polyepoxide is an oligomeric or polymeric diepoxide. In some embodiments, epoxides may be chain extended to have any desirable epoxy equivalent weight. Chain extending epoxy resins can be carried out by reacting a monomeric diepoxide, for example, with a diol in the presence of a catalyst to make a linear polymer. In some embodiments, the resulting epoxy resin (e.g., either an aromatic or non-aromatic epoxy resin) may have an epoxy equivalent weight of at least 150, 170, 200, or 225 grams per equivalent. In some embodiments, the aromatic epoxy resin may have an epoxy equivalent weight of up to 2000, 1500, or 1000 grams per equivalent. In some embodiments, the aromatic epoxy resin may have an epoxy equivalent weight in a range from 150 to 2000, 150 to 1000, or 170 to 900 grams per equivalent. Epoxy equivalent weights may be selected, for example, so that the epoxy resin may be used as a liquid.

Mixtures of polythiols and mixtures of polyepoxides, including any of those described above, may also be useful. Typically the amounts of the polythiol(s) and polyepoxide(s) are selected for the composition so that there is a stoichiometric equivalence of mercaptan groups and epoxide groups.

In some embodiments, the composition is substantially free of a Michael acceptor. A "Michael acceptor" refers to an activated alkene, such as an alkenyl group proximate to an electron-withdrawing group such as a ketone, nitro, halo, nitrile, carbonyl, or nitro group. Michael acceptors are well known in the art. In some embodiments, a Michael acceptor comprises at least one of a vinyl ketone, a vinyl sulfone, a quinone, an enamine, a ketimine, oxazolidine, an acrylate, acrylonitrile, acrylamides, maleimides, alkyl methacrylates, cyanoacrylate, alpha, beta-unsaturated aldehydes, vinyl phosphonates, vinyl pyridines, beta-keto acetylenes, and acetylene esters. "Substantially free" refers to having up to 5, 4, 3, 2, or 1 percent by weight of a Michael acceptor, based on the total weight of the composition. "Substantially free" of a Michael acceptor also includes being free of a Michael acceptor.

Compositions and methods according to the present disclosure include a photolatent base catalyst. A photolatent base catalyst photochemically generates a base that can catalyze the reaction between the polythiol and the polyepoxide. In the compositions and methods disclosed herein, the base is a first amine. Compositions and methods according to the present disclosure also include a second amine, phase-separated from the composition at ambient temperature. In some embodiments, the second amine is different from the first amine. In some embodiments, the first amine and the second amine are the same amine. In these embodiments, the second amine is typically encapsulated as described below. In some embodiments of the compositions and methods according to the present disclosure, the composition includes a third amine. The third amine is not phase-separated from the composition at ambient temperature. Instead it may be dissolved in the composition or may well dispersed in the composition so as to be not physically distinguishable. In some embodiments, the first, second, and third amine are all the same amine. In these embodiments, the second amine is typically encapsulated as described below. In some embodiments, the first, second, and third amines are all different amines. In some embodiments, two of the first, second, and third amines are the same amine. For example, the first and second amine may be the same amine, different from the third amine, or the first and third amine may be the same amine, different from the second amine. The second and third amine may also be the same amine, different from the first amine. In some embodiments, the third amine is different from at least one of the first amine or second amine.

The first amine, second amine, and third amine can independently be any compound including one to four basic nitrogen atoms that bear a lone pair of electrons. The first amine, second amine, and tertiary amine can independently include primary, secondary, and tertiary amine groups. The nitrogen atom(s) in the first amine, second amine, and third amine can be bonded to alkyl groups, aryl groups, arylalkylene groups, alkylarylene, alkylarylenealkylene groups, or a combination thereof. The first amine, second amine, and third amine can also be cyclic amines, which can include one or more rings and can be aromatic or non-aromatic (e.g., saturated or unsaturated). One or more of the nitrogen atoms in the amine can be part of a carbon-nitrogen double bond. While in some embodiments, the first amine, second amine, and third amine independently include only carbon-nitrogen, nitrogen-hydrogen, carbon-carbon, and carbon-hydrogen bonds, in other embodiments, the first amine and second amine can include other functional groups (e.g., hydroxyl or ether group). However, it is understood by a person skilled in the art that a compound including a nitrogen atom bonded to a carbonyl group is an amide, not an amine, and has different chemical properties from an amine. The first amine, second amine, and third amine can include carbon atoms that are bonded to more than one nitrogen atom. Thus, the first amine, second amine, and third amine can independently be a guanidine or amidine. As would be understood by a person skilled in the art, a lone pair of electrons on one or more nitrogens of the first amine, second amine, and third amine distinguishes them from quaternary ammonium compounds, which have a permanent positive charge regardless of pH.

Examples of useful first, second, and third amines include propylamine, butylamine, pentylamine, hexylamine, triethylamine, dimethylethanolamine, benzyldimethylamine, dimethylaniline, tribenzylamine, triphenylamine, tetramethylguanidine (TMG), 1,8-diazabicyclo[5.4.0]undec-7-ene (DBU), 1,5-diazabicyclo[4.3.0]non-5-ene (DBN), 1,4-diazabicyclo[2.2.2]octane (DABCO), quinuclidine, diphenylguanidine (DPG), dimethylaminomethyl phenol, tris(dimethylaminomethyl)phenol, dicyandiamide (DICY), and imidazoles (e.g., imidazole, 2-methylimidazole, 2-ethyl-4-methylimidazole, 2-phenylimidazole, and 1-benzyl-2-methylimidazole). In some embodiments, the first amine, second amine, and third amine are each independently tertiary amines, amidines, imidazoles, or guanidines.

The second amine is phase-separated from the composition at ambient temperature. As a phase-separated amine, the second amine is not reactive with or reacts very slowly with the polythiol and the polyepoxide in the composition at ambient temperature. The phase-separated second amine may be present as a solid, present in a solid adduct, or segregated within a solid in the composition in which the reactive components are generally liquids.

In some embodiments, the second amine is a solid within the composition. In these embodiments, the solid is insoluble in the composition at ambient temperature but dissolves in the composition at an elevated temperature (e.g., at least 50° C., 60° C., 70° C., 75° C., 80° C., 90° C., 95° C., or 100° C.). In some embodiments, the second amine is dicyandiamide (DICY). In some embodiments in which the second amine is a solid within the composition, the second amine is an adduct of an amine and an epoxy resin. The adduct can include any of the amines and any of the epoxy resins described above. Suitable adducts of amines and epoxy resins are commercially available, for example, from Hexion, Inc., Columbus, Ohio, under the trade designation "EPIKURE" and from Ajinomoto Fine-Techno Co., Inc., Kawasaki, Japan, under the trade designation "AJICURE".

In some embodiments, the second amine is segregated within a solid in the composition. Such second amines may be said to be encapsulated and can be made by any of a variety of micro-encapsulation techniques (e.g., coacervation, interfacial addition and condensation, emulsion polymerization, microfluidic polymerization, reverse micelle polymerization, air suspension, centrifugal extrusion, spray drying, prilling, pan coating, other processes, and any combination of these). The second amine may be contained in one single cavity or reservoir within the solid or may be in numerous cavities within solid. The loading level of the second amine may be 5% to 90%, 10% to 90%, or 30% to 90%, based on the total weight of the second amine and solid. In these embodiments, the amine is segregated within the solid at ambient temperature but is released into the composition at an elevated temperature (e.g., at least 50° C., 60° C., 70° C., 75° C., 80° C., 90° C., 95° C., or 100° C.) when the solid at least partially melts. The time required to at least partially melt the solid may be up to 5, 4, 3, 2, or 1 minutes.

In some embodiments of the composition and method according to the present disclosure, the second amine is segregated within a solid in the composition using a coacervation process. Coacervative encapsulation is a three step process: particle or droplet formation; coacervative wall formation; and capsule isolation. The first coacervative capsules were made using gelatin as a wall in an "oil-in-water" system. Later developments produced "water-in-oil" systems for highly polar and water soluble cores. Coacervation is a basic process of capsule wall formation. Examples of the coacervation process are described in U.S. Pat. No. 2,800,457 (Green et al.) and U.S. Pat. No. 2,800,458 (Green).

In some embodiments of the composition and method according to the present disclosure, the second amine is present in a high loading volume (e.g., greater than 75%, based on the total volume of the second amine and the capsule), in a capsule that can be ruptured with pressure. Such capsules, which have a size of about 30 micrometers in diameter, can be made by the process described in U.S. Pat. No. 5,271,881 (Redding, Jr.).

Prilling is also a suitable method for encapsulation of the second amine in the compositions and methods according to the present disclosure that uses highly crystalline waxes with high barrier properties to prevent premature release of the second amine. Prilling, which is also known as spray congealing, spray chilling or melt atomization, provides capsules of sizes between 0.5 micrometer and 3 millimeters with typical loading levels of catalyst of from 5% to 50% by weight, based on the total weight of the second amine and wax. In some of these embodiments, the second amine comprises at least one of TMG and DBU. Examples of highly crystalline waxes suitable for prilling include paraffin waxes, synthetic waxes, microcrystalline waxes, vegetable waxes, polyethylene waxes, low molecular weight polymers, and Fischer-Tropsch waxes with melt points in a range from about 40° C. to 120° C.

Independent of the encapsulation technique used, examples of solids useful for segregating the second amine in the composition include synthetic waxes, microcrystalline waxes, vegetable waxes, polyethylene waxes, polyamides, polyureas (such as polymethyl urea or PMU), Michael addition polymers (i.e. reaction product of a donor such as acetoacetate or malonate and an acceptor such as a multifunctional acrylate), polyacrylates, polyacrylates with crystalline or crystalizable side chains, polyvinyl alcohol, crosslinked polyvinyl alcohol using crosslinkers such as borates, polydimethyl siloxanes, carboxymethyl cellulose, polystyrene, polyethylene vinyl acetate copolymers, polyethylene acrylate copolymers, polyalpha olefins, polyethylenes, polyethylenes prepared via heterogenous catalysis (e.g. metallocene catalyzed), polypropylene, polypropylenes prepared via heterogenous catalysis (e.g. metallocene catalyzed). Highly crystalline solids with sharp melting points (e.g., paraffin waxes, synthetic waxes, and polyethylene waxes) and highly crystalline, low molecular weight polymers (e.g., polyacrylates with crystalline or crystalizable side chain)

may be useful for heat-triggered release of the second amine in some embodiments. Some semi-crystalline polymers useful for segregating the second amine are commercially available, for example, from Air Products & Chemicals, Allentown, Pa., under the trade designation "INTELIMER". Some semi-crystalline polymers encapsulating second amines are commercially available, for example, from Landec Corporation, Menlo Park, Calif., under the trade designation "LANDEC INTELIMER".

Amine catalysts may be incorporated into a semi-crystalline polymer encapsulant by blending at a temperature above the melt temperature of the semi-crystalline polymer, rapidly cooling the mixture, and grinding the solid to a powder.

Further examples of solids useful for segregating the second amine in the composition include water sensitive polymers and waxes. Examples of such water sensitive polymers include crystalline or semi-crystalline such as polyethyleneglycol (PEG), polyvinyl alcohol (PVOH), hydrophobically modified starch, cellulose derivatives (e.g., hydroxypropylcellulose), and polyethyloxazoline.

Combinations of solid encapsulants may be useful, for example, to prevent premature initiation of reaction of the polythiol and polyepoxide with the second amine. Examples include a paraffin or microcrystalline wax shell (e.g., prepared by prilling) followed by a polymethylurea (PMU) shell or a shell prepared by the carbon Michael addition.

Whether the phase-separated second amine is a solid, present in a solid adduct, or segregated within a solid, the solid may have a particle size in a range from 0.1 micrometer to 1 mm, in some embodiments, 0.1 micrometer to 500 micrometers, 0.1 micrometer to 200 micrometers, 0.1 micrometer to 150 micrometers, 0.1 micrometer to 100 micrometers, 0.1 micrometer to 50 micrometers, or 0.1 micrometer to 25 micrometers. The particle size of the solid may be selected such that the second amine can at least partially cure the composition when the composition is exposed to a sufficient temperature.

In some embodiments, the composition according to and/or useful for practicing the present disclosure may comprise from 0.1 wt % to 25 wt %, from 1 wt % to 15 wt %, or from 5 wt % to 10 wt % of a semi-crystalline polymer comprising the second amine. In some embodiments, the composition includes from 0.01 wt % to 2 wt %, from 0.05 wt % to 1.5 wt %, or from 0.5 wt % to 1 wt % of the second amine.

In some embodiments, the second amine is DICY, a solid adduct of an amine and an epoxy resin, or an amine segregated by a polymer with crystalline side chains. In some embodiments, the second amine is segregated by a polymer with crystalline side chains. In some of these embodiments, the second amine comprises at least one of DBN, DBU, TMG, or an imidazole (e.g., imidazole, 2-methylimidazole, 2-ethyl-4-methylimidazole, 2-phenylimidazole, and 1-benzyl-2-methylimidazole).

In the compositions and methods according to the present disclosure, the first amine is photochemically generated from a photolatent base. It should be understood that the first amine, second amine, and third amine themselves are generally not considered photolatent bases. That is, they do not undergo photochemical reactions that generate an amine by photocleavage, photoelimination, or another mechanism.

A variety of photolatent bases can be useful for photochemically generating the first amine. Many useful photolatent bases, any of which may be useful for practicing the present disclosure, have been reviewed in Suyama, K. and Shirai, M., "Photobase Generators: Recent Progress and Application Trend in Polymer Systems" *Progress in Polymer Science* 34 (2009) 194-209. Photolatent bases useful for practicing the present disclosure include photocleavable carbamates (e.g., 9-xanthenylmethyl, fluorenylmethyl, 4-methoxyphenacyl, 2,5-dimethylphenacyl, benzyl, and others), which have been shown to generate primary or secondary amines after photochemical cleavage and liberation of carbon dioxide. Other photolatent bases described in the review as useful for generating primary or secondary amines include certain O-acyloximes, sulfonamides, and formamides. Acetophenones, benzophenones, and acetonaphthones bearing quaternary ammonium substituents are reported to undergo photocleavage to generate tertiary amines in the presence of a variety of counter cations (borates, dithiocarbamates, and thiocyanates). Examples of these photolatent ammonium salts are N-(benzophenonemethyl)tri-N-alkyl ammonium tetraphenylborates. Certain sterically hindered α-aminoketones are also reported to generate tertiary amines.

Recently, quaternary ammonium salts made from a variety of amines and phenylglyoxylic acid have been shown to generate amines that catalyze a thiol/epoxy reaction after exposure to UV light. (See Salmi, H., et al. "Quaternary Ammonium Salts of Phenylglyoxylic acid as Photobase Generators for Thiol-Promoted Epoxide Photopolymerization" *Polymer Chemistry* 5 (2014) 6577-6583.) Such salts are also suitable as photolatent bases useful for practicing the present disclosure.

In some embodiments, the photolatent base useful for practicing the present disclosure is a 1,3-diamine compound represented by the formula $N(R_7)(R_6)-CH(R_5)-N(R_4)-C(R_1)(R_2)(R_3)$ such as those described in U.S. Pat. No. 7,538,104 (Baudin et al.). Such compounds can be considered arylalkylenyl substituted reduced amidines or guanidines. In formula $N(R_7)(R_6)-CH(R_5)-N(R_4)-C(R_1)(R_2)(R_3)$, $R_1$ is selected from aromatic radicals, heteroaromatic radicals, and combinations thereof that absorb light in the wavelength range from 200 nm to 650 nm and that are unsubstituted or substituted one or more times by at least one monovalent group selected from alkyl, alkenyl, alkynyl, haloalkyl, $-NO_2$, $-NR_{10}R_{11}$, $-CN$, $-OR_{12}$, $-SR_{12}$, $-C(O)R_{13}$, $-C(O)OR_{14}$, halogen, groups of the formula $N(R_7)(R_6)-CH(R_5)-N(R_4)-C(R_2)(R_3)-$ where $R_2$-$R_7$ are as defined below, and combinations thereof, and that upon absorption of light in the wavelength range from 200 nm to 650 nm bring about a photoelimination that generates an amidine or guanidine. $R_2$ and $R_3$ are each independently selected from hydrogen, alkyl, phenyl, substituted phenyl (that is, substituted one or more times by at least one monovalent group selected from alkyl, $-CN$, $-OR_{12}$, $-SR_{12}$, halogen, haloalkyl, and combinations thereof), and combinations thereof; $R_5$ is selected from alkyl, $-NR_8R_9$, and combinations thereof; $R_4$, $R_6$, $R_7$, $R_8$, $R_9$, $R_{10}$ and $R_{11}$ are each independently selected from hydrogen, alkyl, and combinations thereof; or $R_4$ and $R_6$ together form a $C_2$-$C_{12}$ alkylene bridge that is unsubstituted or is substituted by one or more monovalent groups selected from $C_1$-$C_4$ alkyl radicals and combinations thereof; or $R_5$ and $R_7$, independently of $R_4$ and $R_6$, together form a $C_2$-$C_{12}$ alkylene bridge that is unsubstituted or is substituted by one or more monovalent groups selected from $C_1$-$C_4$ alkyl radicals and combinations thereof; or, if $R_5$ is $-NR_8R_9$, then $R_7$ and $R_9$ together form a $C_2$-$C_{12}$ alkylene bridge that is unsubstituted or is substituted by one or more monovalent groups selected from $C_1$-$C_4$ alkyl radicals and combinations thereof; and $R_{12}$, $R_{13}$, and $R_{14}$ are each independently selected from hydrogen, alkyl, and combinations thereof. Any of the alkyl and haloalkyl groups above can be linear or branched and, in some embodiments, contain 1 to about 19 carbon atoms (in some embodiments, 1 to about 18, 1 to about 12, or 1 to about 6 carbon atoms). In some embodiments, halogen atoms are chlorine, fluorine, and/or bromine (in some embodiments, chlorine and/or fluorine). The alkenyl groups can be linear or branched and, in some embodiments, contain 2 to about 18 carbon atoms (in some embodiments, 2 to about 12 or 2 to about 6 carbon atoms). The alkynyl groups can be linear or branched and, in some embodiments, contain 2 to about 18 carbon atoms (in some embodiments, 2 to about 12 or 2 to about 6 carbon atoms).

In some embodiments of formula $N(R_7)(R_6)$—$CH(R_5)$—$N(R_4)$—$C(R_1)(R_2)(R_3)$, $R_1$ is selected from substituted and unsubstituted phenyl, naphthyl, phenanthryl, anthryl, pyrenyl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, anthraquinonyl, dibenzofuryl, chromenyl, xanthenyl, thioxanthyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, terphenyl, stilbenyl, fluorenyl, phenoxazinyl, and combinations thereof, any of these being unsubstituted or substituted one or more times by $C_1$-$C_{18}$ alkyl, $C_2$-$C_{18}$ alkenyl, $C_2$-$C_{18}$ alkynyl, $C_1$-$C_{18}$ haloalkyl, —$NO_2$, —$NR_{10}R_{11}$, —CN, —$OR_{12}$, —$SR_{12}$, —$C(O)R_{13}$, —$C(O)OR_{14}$, halogen, a radical of the formula $N(R_7)(R_6)$—$CH(R_5)$—$N(R_4)$—$C(R_2)(R_3)$—, or a combination thereof, where $R_2$-$R_7$ and $R_{10}$-$R_{14}$ are as defined above. In some embodiments of formula $N(R_7)(R_6)$—$CH(R_5)$—$N(R_4)$—$C(R_1)(R_2)(R_3)$, $R_1$ is a substituted or unsubstituted biphenylyl radical, wherein each phenyl group is independently substituted with from zero to three (preferably, zero or one) substituents selected from $C_1$-$C_{18}$ alkyl, $C_2$-$C_{18}$ alkenyl, —OH, —CN, —$OR_{10}$, —$SR_{10}$, halogen, radicals of the formula $N(R_7)(R_6)$—$CH(R_5)$—$N(R_4)$—$C(R_2)(R_3)$—, and combinations thereof, where $R_2$-$R_7$ and $R_{10}$-$R_{14}$ are as defined above. In some embodiments of formula $N(R_7)(R_6)$—$CH(R_5)$—$N(R_4)$—$C(R_1)(R_2)(R_3)$, $R_1$ is selected from phenyl, 3-methoxyphenyl, 4-methoxyphenyl, 2,4,6-trimethoxyphenyl, 2,4-dimethoxyphenyl, and combinations thereof.

In some embodiments of formula $N(R_7)(R_6)$—$CH(R_5)$—$N(R_4)$—$C(R_1)(R_2)(R_3)$, $R_2$ and $R_3$ each are independently selected from hydrogen, $C_1$-$C_6$ alkyl, and combinations thereof (in some embodiments, both are hydrogen); $R_4$ and $R_6$ together form a $C_2$-$C_6$ alkylene (in some embodiments, $C_3$ alkylene) bridge that is unsubstituted or is substituted by one or more groups selected from $C_1$-$C_4$ alkyl radicals and combinations thereof; and/or $R_5$ and $R_7$ together form a $C_2$-$C_6$ alkylene (in some embodiments, $C_3$ or $C_5$ alkylene) bridge that is unsubstituted or is substituted by one or more groups selected from $C_1$-$C_4$ alkyl radicals and combinations thereof, or, if $R_5$ is —$NR_8R_9$, $R_9$ and $R_7$ together form a $C_2$-$C_6$ alkylene bridge that is unsubstituted or substituted by one or more groups selected from $C_1$-$C_4$ alkyl radicals and combinations thereof.

Examples of suitable photolatent bases useful for practicing the present disclosure include 5-benzyl-1,5-diazabicyclo[4.3.0]nonane, 5-(anthracen-9-yl-methyl)-1,5-diaza[4.3.0]nonane, 5-(2'-nitrobenzyl)-1,5-diazabicyclo[4.3.0]nonane, 5-(4'-cyanobenzyl)-1,5-diazabicyclo[4.3.0]nonane, 5-(3'-cyanobenzyl)-1,5-diazabicyclo[4.3.0]nonane, 5-(anthraquinon-2-yl-methyl)-1,5-diaza[4.3.0]nonane, 5-(2'-chlorobenzyl)-1,5-diazabicyclo[4.3.0]nonane, 5-(4'-methylbenzyl)-1,5-diazabicyclo[4.3.0]nonane, 5-(2',4',6'-trimethylbenzyl)-1,5-diazabicyclo[4.3.0]nonane, 5-(4'-ethenylbenzyl)-1,5-diazabicyclo[4.3.0]nonane, 5-(3'-trimethylbenzyl)-1,5-diazabicyclo[4.3.0]nonane, 5-(2',3'-dichlorobenzyl)-1,5-diazabicyclo[4.3.0]nonane, 5-(naphth-2-yl-methyl-1,5-diazabicyclo[4.3.0]nonane, 1,4-bis(1,5-diazabicyclo[4.3.0]nonanylmethyl)benzene, 8-benzyl-1,8-diazabicyclo[5.4.0]undecane, 8-benzyl-6-methyl-1,8-diazabicyclo[5.4.0]undecane, 9-benzyl-1,9-diazabicyclo[6.4.0]dodecane, 10-benzyl-8-methyl-, 10-diazabicyclo[7.4.0]tridecane, 11-benzyl-1,11-diazabicyclo[8.4.0]tetradecane, 8-(2'-chlorobenzyl)-1,8-diazabicyclo[5.4.0]undecane, 8-(2',6'-dichlorobenzyl)-1,8-diazabicyclo[5.4.0]undecane, 4-(diazabicyclo[4.3.0]nonanylmethyl)-1,1'-biphenyl, 4,4'-bis(diazabicyclo[4.3.0]nonanylmethyl)-11'-biphenyl, 5-benzyl-2-methyl-1,5-diazabicyclo[4.3.0]nonane, 5-benzyl-7-methyl-1,5,7-triazabicyclo[4.4.0]decane, and combinations thereof. Such compounds can be made, for example, using the methods described in U.S. Pat. No. 7,538,104 (Baudin et al.), assigned to BASF, Ludwigshafen, Germany. An example of a photolatent base is available from BASF under the trade designation "CGI 90", which is reported to generate 1,5-diazabicyclo[4.3.0]non-5-ene (DBN) upon exposure to actinic radiation (see, e.g., US2013/0345389 (Cai et al.).

Other suitable photolatent bases useful for the compositions according to the present disclosure and/or for practicing the methods disclosed herein include those described in U.S. Pat. No. 6,410,628 (Hall-Goulle et al.), U.S. Pat. No. 6,087,070 (Turner et al.), U.S. Pat. No. 6,124,371 (Stanssens et al.), and U.S. Pat. No. 6,057,380 (Birbaum et al.), and U.S. Pat. Appl. Pub. No. 2011/01900412 (Studer et al.).

In some embodiments, compositions according to the present disclosure in any of the embodiments described above and below include the photolatent base catalyst in an amount from 0.1 percent to 10.0 percent by weight, based on the total weight of the composition. In some embodiments, the photolatent base catalyst is included in the composition in an amount from 0.5 percent to 10 percent, or 0.5 percent to 5 percent by weight, or 1 to 5 percent by weight, based on the total weight of the composition.

In some embodiments, useful photolatent bases absorb light in a wavelength range from 200 nm to 650 nm. For some applications (e.g., sealants), compositions according to the present disclosure (which include the photolatent base) absorb light in the ultraviolet A (UVA) and/or blue light regions, for example, in a wavelength range from 315 nm to 550 nm or 315 nm to 500 nm. UVA light can be considered to have a wavelength range of 315 nm to 400 nm, and blue light can be considered to have a wavelength range of 450 nm to 495 nm.

In some embodiments, the composition according to the present disclosure and/or useful for practicing the methods according to the present disclosure further include at least one photosensitizer. A photosensitizer can be useful, for example, if the photolatent base does not have a strong absorbance in a wavelength range that is desired for curing the composition. As used herein, a photosensitizer may be understood to be, for example, a compound having an absorption spectrum that overlaps or closely matches the emission spectrum of the radiation source to be used and that can improve the overall quantum yield by means of, for example, energy transfer or electron transfer to other component(s) of the composition (e.g., the photolatent base). Useful photosensitizers include aromatic ketones (e.g., substituted or unsubstituted benzophenones, substituted or unsubstituted thioxanthones, substituted or unsubstituted anthraquinones, and combinations thereof), dyes (e.g., oxazines, acridines, phenazines, rhodamines, and combinations thereof), 3-acylcoumarins (e.g., substituted and unsubstituted 3-benzoylcoumarins and substituted and unsubstituted 3-naphthoylcoumarins, and combinations thereof), anthracenes (e.g., substituted and unsubstituted anthracenes), 3-(2-benzothiazolyl)-7-(diethylamino)coumarin (coumarin 6), 10-acetyl-2,3,6,7-tetrahydro-1H,5H,11H-[1]benzopyrano[6,7,8-ij]quinolizin-11-one (coumarin 521), other carbonyl compounds (e.g., camphorquinone, 4-phenylacetophenone, benzil, and xanthone, and combinations thereof), and combinations thereof. In some embodiments, the photosensitizer has an absorbance in the blue light range. In some embodiments, the photosensitizer is camphorquinone. In some embodiments, coumarin photosensitizers that are triplet photosensitizers with a wavelength of maximum absorbance, $\lambda_{max}$, between 390 to 510 nm are used in combination with camphorquinone. Examples of such coumarin photosensitizers include 3,3'-carbonylbis(5,7-dimethoxycoumarin), 3-benzoyl-7-diethylaminocoumarin, 7-diethylamino-3-thenoylcoumarin, 3-(2-benzofuroyl)-7-diethylaminocoumarin, 7-diethylamino-5',7'-dimethoxy-3,3'-carbonylbiscoumarin, 3,3'-carbonylbis(7-diethylaminocoumarin), 9-(7-diethylamino-3-coumarinoyl)-1,2,4,5-tetrahydro-3H,6H,10H[1]benzopyrano[9,9a,1-gh]quinolazine-10-one, and 9,9'-carbonylbis(1,2,4,5-tetrahydro-3H,6H,10H[1]benzopyrano[9,9a,1-gh]quinolazine-10-one). Further details about compositions including a photolatent base, camphorquinone, and such coumarins can be found in U.S. Pat. App. Ser. No. 62/417,158 (Clough et al.), filed Nov. 3, 2016. The amount of photosensitizer can vary widely, depending upon, for example, its nature, the nature of other component(s) of the photoactivatable composition, and the particular curing conditions. For example, amounts ranging from about 0.1 weight percent to about 15 weight percent can be useful for some applications. In some embodiments, the photosensitizer is included in the composition in an amount from 0.5 percent to 10 percent by weight, 0.5 percent to 7.5 percent by weight, or 1 percent to 7.5 percent by weight, based on the total weight of the composition.

In embodiments in which the third amine is present in the composition according to and/or useful for practicing the method of the present disclosure, the third amine and its amount may be selected to provide the composition with a desirable amount of open time (that is, the approximate amount of time the composition exhibits sufficient flow in order to wet out a surface when manually spread with a spatula at 21° C.) after it is mixed or thawed. In some embodiments, the composition has an open time of at least 10 minutes, at least 30 minutes, at least one hour, or at least two hours. The amount of the third amine and its conjugate acid pKa both affect the open time. A composition with a smaller amount of a third amine having a higher pKa may have the same open time as a composition having a larger amount of a third amine having a lower pKa. For a third amine with a moderate conjugate acid pKa value in a range from about 7 to about 10, an amount of third amine in a range from 0.05 weight percent to about 10 weight percent (in some embodiments, 0.05 weight percent to 7.5 weight percent, or 1 weight percent to 5 weight percent) may be useful. For a third amine with a higher conjugate acid pKa value of about 11 or more, an amount of third amine in a range from 0.005 weight percent to about 3 weight percent (in some embodiments, 0.05 weight percent to about 2 weight percent) may be useful. In some embodiments in which the third amine is different from at least one of the first amine or second amine, the third amine has a lower conjugate acid pKa value than at least one of the first amine or second amine. This may be useful, for example, for achieving a desirable amount of open time and a desirably fast cure-on-demand. In some embodiments in which the third amine is different from at least one of the first amine or second amine, the third amine and at least one of the first amine or the second amine have the same conjugate acid pKa value.

As shown in the Examples below (Tables 5 and 7), the composition according to the present disclosure typically has an open time that can be useful for the production of very large structures, as is typical in the aircraft industry, and does not require heating above ambient conditions to cure. Thus, use of the composition as a sealant may avoid unpredictable performance that may be associated with overheating either the sealant material, the structure to be sealed, or both.

When used in sealant applications, for example, compositions according to the present disclosure can also contain fillers. Conventional inorganic fillers such as silica (e.g., fumed silica), calcium carbonate, aluminum silicate, and carbon black may be useful as well as low-density fillers. In some embodiments, the composition according to the present disclosure includes at least one of silica, hollow ceramic elements, hollow polymeric elements, calcium silicates, calcium carbonate, or carbon black. Silica, for example, can be of any desired size, including particles having an average size above 1 micrometer, between 100 nanometers and 1 micrometer, and below 100 nanometers. Silica can include nanosilica and amorphous fumed silica, for example. Suitable low density fillers may have a specific gravity ranging from about 1.0 to about 2.2 and are exemplified by calcium silicates, fumed silica, precipitated silica, and polyethylene. Examples include calcium silicate having a specific gravity of from 2.1 to 2.2 and a particle size of from 3 to 4 microns ("HUBERSORB HS-600", J. M. Huber Corp.) and fumed silica having a specific gravity of 1.7 to 1.8 with a particle size less than 1 ("CAB-O-SIL TS-720", Cabot Corp.). Other examples include precipitated silica having a specific gravity of from 2 to 2.1 ("HI-SIL TS-7000", PPG Industries), and polyethylene having a specific gravity of from 1 to 1.1 and a particle size of from 10 to 20 microns ("SHAMROCK S-395" Shamrock Technologies Inc.). The term "ceramic" refers to glasses, crystalline ceramics, glass-ceramics, and combinations thereof. Hollow ceramic elements can include hollow spheres and spheroids. The hollow ceramic elements and hollow polymeric elements may have one of a variety of useful sizes but typically have a maximum dimension of less than 500 micrometers, more typically less than 100 micrometers. The specific gravities of the microspheres range from about 0.1 to 0.7 and are exemplified by polystyrene foam, microspheres of polyacrylates and polyolefins, and silica microspheres having particle sizes ranging from 5 to 100 microns and a specific gravity of 0.25 ("ECCOSPHERES", W. R. Grace & Co.). Other examples include elastomeric particles available, for example, from Akzo Nobel, Amsterdam, The Netherlands, under the trade designation "EXPANCEL". Yet other examples include alumina/silica microspheres having particle sizes in the range of 5 to 300 microns and a specific gravity of 0.7 ("FILLITE", Pluess-Stauffer International), aluminum silicate microspheres having a specific gravity of from about 0.45 to about 0.7 ("Z-LIGHT"), and calcium carbonate-coated polyvinylidene copolymer microspheres having a specific gravity of 0.13 ("DUALITE 6001AE", Pierce & Stevens Corp.). Further examples of commercially available materials suitable for use as hollow, ceramic elements include glass bubbles marketed by 3M Company, Saint Paul, Minn., as "3M GLASS BUBBLES" in grades K1, K15, K20, K25, K37, K46, S15, S22, S32, S35, S38, S38HS, S38XHS, S42HS, S42XHS, S60, S60HS, iM30K, iM16K, XLD3000, XLD6000, and G-65, and any of the HGS series of "3M GLASS BUBBLES"; glass bubbles marketed by Potters Industries, Carlstadt, N.J., under the trade designations "Q-CEL HOLLOW SPHERES" (e.g., grades 30, 6014, 6019, 6028, 6036, 6042, 6048, 5019, 5023, and 5028); and hollow glass particles marketed by Silbrico Corp., Hodgkins, Ill., under the trade designation "SIL-CELL" (e.g., grades SIL 35/34, SIL-32, SIL-42, and SIL-43). Such fillers, alone or in combination, can be present in a sealant in a range from 10 percent by weight to 55 percent by weight, in some embodiments, 20 percent by weight to 50 percent by weight, based on the total weight of the sealant composition.

When used in sealant applications, for example, compositions according to the present disclosure can also contain at least one of cure accelerators, surfactants, adhesion promoters, thixotropic agents, colorants (e.g., pigments and dyes), and solvents. The solvent can conveniently be any material (e.g., N-methyl-2-pyrrolidone, tetrahydrofuran, ethyl acetate, or those described below) capable of dissolving the photolatent base or another component of the composition. Suitable pigments and dyes can include those that do not absorb in the wavelength range that is desirable for curing the composition. Examples of pigments and dyes useful in the compositions according to the present disclosure can be found in U.S. Pat. App. Ser. No. 62/416,958 (Townsend et al.), filed on Nov. 3, 2016.

In some embodiments, compositions according to the present disclosure include at least one oxidizing agent. Oxidizing agents can be useful, for example, when the composition according to the present disclosure includes a polysulfide oligomer or polymer. In these compositions, oxidizing agents can minimize the degradation or interchanging of disulfide bonds in the sealant network. Useful oxidizing agents include a variety of organic and inorganic oxidizing agents (e.g., organic peroxides and metal oxides). Examples of metal oxides useful as oxidizing agents include calcium dioxide, manganese dioxide, zinc dioxide, lead dioxide, lithium peroxide, and sodium perborate hydrate. Other useful inorganic oxidizing agents include sodium dichromate. Examples of organic peroxides useful as oxidizing agents include hydroperoxides (e.g., cumene, tert-butyl or tert-amyl hydroperoxide), dialkyl peroxides (e.g., di-tert-butylperoxide, dicumylperoxide, or cyclohexyl peroxide), peroxyesters (e.g., tert-butyl perbenzoate, tert-butyl peroxy-2-ethylhexanoate, tert-butyl peroxy-3,5,5-trimethylhexanoate, tert-butyl monoperoxymaleate, or di-tert-butyl peroxyphthalate), peroxycarbonates (e.g., tert-butylperoxy 2-ethylhexylcarbonate, tert-butylperoxy isopropyl carbonate, or di(4-tert-butylcyclohexyl) peroxydicarbonate), ketone peroxides (e.g., methyl ethyl ketone peroxide, 1,1-di(tert-butylperoxy)cyclohexane, 1,1-di(tert-butylperoxy)-3,3,5-trimethylcyclohexane, and cyclohexanone peroxide), and diacylperoxides (e.g., benzoyl peroxide or lauryl peroxide). Other useful organic oxidizing agents include para-quinone dioxime.

As shown in the Examples, below, compositions according to the present disclosure cure remarkably well in the presence of filler. When the samples were exposed to 455 nm blue light, cure depths of at least 0.5 millimeter, at least one millimeter, or greater than one millimeter were achieved. Such cure depths may be achieved even when manganese dioxide is used as an oxidant. In polysulfide-based sealants, manganese dioxide is commonly added as an oxidation agent with excess to prevent disulfide bond degradation or interchanging. However, manganese dioxide is black and typically tends to limit the depth of curing.

Compositions according to the present disclosure can be made by combining a polythiol comprising more than one thiol group, a polyepoxide comprising more than one epoxide group, a second amine, which may be a solid or encapsulated within a solid, and a photolatent base catalyst, wherein the photolatent base catalyst can photochemically generate a first amine. The polythiol, polyepoxide, second amine, and photolatent base catalyst can be those as described above in any of their embodiments. In some embodiments, the third amine (e.g., in a catalytic amount) can also be added. In these embodiments, it should be noted that the third amine is present in the composition even before light exposure causes the photolatent base catalyst to generate the first amine or heating causes the second amine to dissolve in the composition. The polythiol, polyepoxide, the photolatent base, the second amine phase-separated from the composition, optionally the third amine, and any other components described in any of the above embodiments may be provided as a one-part composition. To make a one-part composition, the components may be added in any convenient order. It may be useful to store such a composition frozen and away from light before it is applied (e.g., as a sealant) and cured. The composition may also arise from combining components of a two-part system. For example, a first component comprising the polyepoxide can conveniently be combined with a second component comprising the polythiol, the photolatent base, the second amine, and optionally the third amine to generate the composition according to the present disclosure. In another example, a first component may comprise the polyepoxide and at least one of the photolatent base or the second amine, and a second component may comprise the polythiol and the third amine. Other combinations may also be useful.

In some embodiments, compositions according to the present disclosure can be made by providing a starting composition comprising the polythiol comprising more than one thiol group, the polyepoxide comprising more than one epoxide group, and the second amine, phase-separated within the composition, and optionally the third amine. The starting composition may be stored frozen as a one-part composition or stored as a two-part composition and mixed shortly before use. The starting composition may, in some embodiments, be applied to a substrate to be coated or sealed, for example, leaving a surface of the starting composition exposed. A solution comprising the photolatent base catalyst can then be applied to the surface of the starting composition. The solution comprising the photolatent base can be applied by any convenient method, for example, dip coating, knife coating, reverse roll coating, brushing, and spraying (e.g., aerosol spraying or electrostatic spraying). The solution may be allowed to penetrate into the composition for any desired length of time to allow the photolatent base to combine with the polythiol and polyepoxide. In some embodiments, the solution further comprises a photosensitizer (e.g., any of the photosensitizers described above). Following the application of the solution comprising the photolatent base to the surface of the starting composition, at least a non-tacky skin can be made on the surface by exposing the applied photolatent base to an appropriate light source. The non-tacky skin can advantageously serve to protect the underlying composition while it continues to cure (e.g., by means of at least one of the second amine or third amine).

In these embodiments, the solution including the photolatent base and optionally the photosensitizer can include any suitable solvent or solvents capable of dissolving these components. The components may be present in the solvent at any suitable concentration, (e.g., from about 5 percent to about 90 percent by weight based on the total weight of the solution). Illustrative examples of suitable solvents include aliphatic and alicyclic hydrocarbons (e.g., hexane, heptane, and cyclohexane), aromatic solvents (e.g., benzene, toluene, and xylene), ethers (e.g., diethyl ether, glyme, diglyme, and diisopropyl ether), esters (e.g., ethyl acetate and butyl acetate), alcohols (e.g., ethanol and isopropyl alcohol), ketones (e.g., acetone, methyl ethyl ketone, and methyl isobutyl ketone), sulfoxides (e.g., dimethyl sulfoxide), amides (e.g., N,N-dimethylformamide and N,N-dimethylacetamide), halogenated solvents (e.g., methylchloroform, 1,1, 2-trichloro-1,2,2-trifluoroethane, trichloroethylene, and trifluorotoluene), and mixtures thereof. When an aromatic photosensitizer is present, an aromatic solvent may be useful.

In some embodiments, the method of making a polymer network includes exposing the composition disclosed herein in any of its embodiments to light to generate the first amine to at least partially cure the composition. The light source and exposure time can be selected, for example, based on the nature and amount of the composition. Sources of ultraviolet and/or visible light can be useful (for example, wavelengths ranging from about 200 nm to about 650 nm, from about 315 nm to 550 nm, or from about 315 nm to 500 nm can be useful). Suitable light includes sunlight and light from artificial sources, including both point sources and flat radiators. In some embodiments, the light source is a source of at least one of UVA or blue light. In some embodiments, the light source is a blue light source.

Examples of useful light sources include carbon arc lamps; xenon arc lamps; medium-pressure, high-pressure, and low-pressure mercury lamps, doped if desired with metal halides (metal halogen lamps); microwave-stimulated metal vapor lamps; excimer lamps; superactinic fluorescent tubes; fluorescent lamps; incandescent argon lamps; electronic flashlights; xenon flashlights; photographic flood lamps; light-emitting diodes; laser light sources (for example, excimer lasers); and combinations thereof. The distance between the light source and the coated substrate can vary widely, depending upon the particular application and the type and/or power of the light source. For example, distances up to about 150 cm, distances from about 0.01 cm to 150 cm, or a distance as close as possible without touching the composition can be useful.

Depending on various factors, exposure to light might be sufficient to cure the composition to the desired non-tackiness and hardness. In some embodiments, exposing the composition to light comprises exposing the composition to a light source that allows the composition to achieve a temperature sufficient for the second amine to at least partially cure the composition. In these embodiments, exposure to light may provide sufficient heat to melt the second amine or melt a semi-crystalline polymer that segregates the second amine from the composition. In some embodiments, the second amine is a solid, and the temperature is sufficient to melt the solid. In some embodiments, the second amine is segregated within a solid in the composition, wherein the solid is polymer with crystalized side chains, and wherein the temperature is sufficient to melt the side chains. In any of these embodiments, the temperature may be, for example, at least 50° C., 60° C., 70° C., 75° C., 80° C., 90° C., 95° C., or 100° C.

In some embodiments, the thickness of the composition, the presence and nature of filler, the existence and size of areas shielded from light, and other factors may prevent the curing of the composition to the desired non-tackiness and hardness by exposure to light. For some applications, exposure to light may not be possible or may be inadvertently omitted after applying the composition to a substrate. In these embodiments, the method of making a polymer network includes allowing the composition to achieve a temperature sufficient for the second amine to at least partially cure the composition. In these embodiments, the composition may be heated at an elevated temperature (e.g., at least 50° C., 60° C., 70° C., 75° C., 80° C., 90° C., 95° C., or 100° C.) for a time sufficient to melt or release the second amine from a semi-crystalline polymer. The time may be up to 5, 4, 3, 2, or 1 minutes. In these embodiments, the method of making a polymer network includes allowing the composition to achieve a temperature sufficient for the third amine to at least partially cure the composition. In some embodiments, the temperature sufficient for the third amine to at least partially cure the composition is ambient temperature (that is, no external heat source is necessary). In these embodiments, the catalytic amount of the third amine serves as a useful backup cure mechanism for the composition.

For any of the embodiments of the methods according to the present disclosure, exposing the composition to light at least partially cures the composition. In some of these embodiments, at least the surface of the composition is cured to an extent that the surface becomes non-tacky. A non-tacky surface may be one in which the surface no longer tightly adheres to L-LP-690 standard low density polyethylene film as determined using ASTM C679. A non-tacky surface may also be one that is FOD-free according to the following evaluation. After curing, fine aluminum shavings can be spread on to the cured sealant surface and allowed to remain undisturbed for 30 seconds at 70° F. (21.1° C.). The sealant can then be inverted to allow the shavings to fall off, after which the sealant surface can be gently brushed using a fine fiber paintbrush to remove any remaining aluminum shavings. The surface can be considered FOD-free, akin to non-tacky, if no aluminum shavings remain on the surface after inversion and/or after brushing. Such a non-tacky surface may be achieved after exposure of the composition disclosed herein to a light source for up to 10 minutes, up to 5 minutes, up to 3 minutes, up to 2 minutes, or, in some cases, up to 1 minute or up to 30 seconds. Without exposure to light, in some embodiments, the composition according to the present disclosure exhibits at least one of a non-tacky surface or a 30 Shore "A" hardness in less than 24 hours, in some embodiments, less than 12 hours or 10 hours under ambient conditions. With or without exposure to light, in some embodiments, the compositions according to the present disclosure can achieve a 45 to 50 Shore "A" hardness in up to 2 weeks, up to 1 week, up to 5 days, up to 3 days, or up to 1 day.

Polymer networks prepared with polythiols and polyepoxides as described above in any of their embodiments are useful for a variety of applications. For example, such polymer networks can be useful as sealants, for example, aviation fuel resistant sealants. Aviation fuel resistant sealants are widely used by the aircraft industry for many purposes. Commercial and military aircraft are typically built by connecting a number of structural members, such as longitudinal stringers and circular frames. The aircraft skin, whether metal or composite, is attached to the outside of the stringers using a variety of fasteners and adhesives. These structures often include gaps along the seams, joints between the rigidly interconnected components, and overlapping portions of the exterior aircraft skin. The composition according to the present disclosure can be useful, for example, for sealing such seams, joints, and overlapping portions of the aircraft skin. The composition may be applied, for example, to aircraft fasteners, windows, access panels, and fuselage protrusions. As a sealant, the composition disclosed herein may prevent the ingress of weather and may provide a smooth transition between the outer surfaces to achieve desired aerodynamic properties. The composition according to the present disclosure may likewise be applied to interior assembles to prevent corrosion, to contain the various fluids and fuels necessary to the operation of an aircraft, and to allow the interior of the aircraft (e.g., the passenger cabin) to maintain pressurization at higher altitudes. Among these uses are the sealing of integral fuel tanks and cavities.

Aircraft exterior and interior surfaces, to which sealants may be applied, may include metals such as titanium, stainless steel, and aluminum, and/or composites, any of which may be anodized, primed, organic-coated or chromate-coated. For example, a dilute solution of one or more phenolic resins, organo-functional silanes, titanates or zirconantes, and a surfactant or wetting agent dissolved in organic solvent or water may be applied to an exterior or interior surface and dried.

Sealants may optionally be used in combination with a seal cap, for example, over rivets, bolts, or other types of fasteners. A seal cap may be made using a seal cap mold, filled with a curable sealant, and placed over a fastener. The curable sealant may then be cured. In some embodiments, the seal cap and the curable sealant may be made from the same material. In some embodiments, the seal cap may be made from a curable composition disclosed herein. For more details regarding seal caps, see, for example, Int. Pat. App. Pub. No. WO2014/172305 (Zook et al.).

In some embodiments, compositions according to the present disclosure may be useful in these applications, for example, because of their fuel resistance and low glass transition temperatures. In some embodiments, the polymer network according to the present disclosure has a low glass transition temperature, in some embodiments less than −20° C., in some embodiments less than −30° C., in some embodiments less than −40° C., and in some embodiments less than −50° C. In some embodiments, the polymer network according to the present disclosure has high jet fuel resistance, characterized by a volume swell of less than 30% and a weight gain of less than 20% when measured according to Society of Automotive Engineers (SAE) International Standard AS5127/1.

Some Embodiments of the Disclosure

In a first embodiment, the present disclosure provides a composition comprising:
 a polythiol comprising more than one thiol group;
 a polyepoxide comprising more than one epoxide group;
 a photolatent base catalyst, wherein the photolatent base catalyst can photochemically generate a first amine; and
 a second amine that is phase-separated within the composition.

In a second embodiment, the present disclosure provides the composition of the first embodiment, wherein the first amine and second amine are each independently a tertiary amine or a guanidine.

In a third embodiment, the present disclosure provides the composition of the first or second embodiment, wherein the first amine and second amine are each independently an amidine or a guanidine.

In a fourth embodiment, the present disclosure provides the composition of any one of the first to third embodiments, wherein at least one of the first amine or second amine is triethylamine, dimethylethanolamine, benzyldimethylamine, dimethylaniline, tribenzylamine, triphenylamine, tetramethylguanidine (TMG), 1,8-diazabicyclo[5.4.0]undec-7-ene (DBU), 1,5-diazabicyclo[4.3.0]non-5-ene (DBN), 1,4-diazabicyclo[2.2.2]octane (DABCO), quinuclidine, diphenylguanidine (DPG), dimethylaminomethyl phenol, and tris(dimethylaminomethyl)phenol.

In a fifth embodiment, the present disclosure provides the composition of any one of the first to fourth embodiments, wherein at least one of the first amine or second amine comprises at least one of tetramethylguanidine, diphenylguanidine, 1,4-diazabicyclo[2.2.2]octane (DABCO), quinuclidine, 1,8-diazabicyclo[5.4.0]undec-7-ene, or 1,5-diazabicyclo[4.3.0]non-5-ene.

In a sixth embodiment, the present disclosure provides the composition of any one of the first to fifth embodiments, wherein the first amine and second amine are the same amine.

In a seventh embodiment, the present disclosure provides the composition of any one of the first to fifth embodiments, wherein the first amine and second amine are different amines.

In an eighth embodiment, the present disclosure provides the composition of any one of the first to seventh embodiments, further comprising a third amine that is not phase-separated.

In a ninth embodiment, the present disclosure provides the composition of the eighth embodiment, wherein the first amine, the second amine, and the third amine are each independently a tertiary amine or a guanidine.

In a tenth embodiment, the present disclosure provides the composition of the eighth or ninth embodiment, wherein the first amine, second amine, and third amine are each independently an amidine or a guanidine.

In an eleventh embodiment, the present disclosure provides the composition of any one of the eighth to tenth embodiments, wherein at least one of the first amine, the second, or the third amine is triethylamine, dimethylethanolamine, benzyldimethylamine, dimethylaniline, tribenzylamine, triphenylamine, tetramethylguanidine (TMG), 1,8-diazabicyclo[5.4.0]undec-7-ene (DBU), 1,5-diazabicyclo[4.3.0]non-5-ene (DBN), 1,4-diazabicyclo[2.2.2]octane (DABCO), diphenylguanidine (DPG), dimethylaminomethyl phenol, and tris(dimethylaminomethyl)phenol.

In a twelfth embodiment, the present disclosure provides the composition of any one of the eighth to eleventh embodiments, wherein at least one of the first amine, the second amine, or the third amine comprises at least one of tetramethylguanidine, diphenylguanidine, 1,4-diazabicyclo[2.2.2]octane (DABCO), quinuclidine, 1,8-diazabicyclo[5.4.0]undec-7-ene, or 1,5-diazabicyclo[4.3.0]non-5-ene.

In a thirteenth embodiment, the present disclosure provides the composition of any one of the eighth to twelfth embodiments except as dependent on the seventh embodiment, wherein the first amine, the second amine, and the third amine are the same amine.

In a fourteenth embodiment, the present disclosure provides the composition of any one of the eighth to twelfth embodiments except as dependent on the sixth embodiment, wherein at least one of the first amine or the second amine is different from the third amine.

In a fifteenth embodiment, the present disclosure provides the composition of the fourteenth embodiment, wherein at least one of the first amine or second amine has a higher conjugate acid pKa than the third amine.

In a sixteenth embodiment, the present disclosure provides the composition of the fourteenth or fifteenth embodiment, wherein at least one of the first amine or the second amine comprises at least one of tetramethylguanidine, diphenylguanidine, 1,8-diazabicyclo[5.4.0]undec-7-ene, quinuclidine, or 1,5-diazabicyclo[4.3.0]non-5-ene.

In seventeenth embodiment, the present disclosure provides the composition of any one of the thirteenth to sixteenth embodiments, wherein the third amine is 1,4-diazabicyclo[2.2.2]octane.

In an eighteenth embodiment, the present disclosure provides the composition of any one of the first to seventh embodiments, wherein the photolatent base is represented by formula:

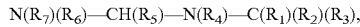

N(R$_7$)(R$_6$)—CH(R$_5$)—N(R$_4$)—C(R$_1$)(R$_2$)(R$_3$), wherein

R$_1$ is selected from phenyl, naphthyl, phenanthryl, anthryl, pyrenyl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, anthraquinonyl, dibenzofuryl, chromenyl, xanthenyl, thioxanthyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, terphenyl, stilbenyl, fluorenyl, phenoxazinyl, and combinations thereof, wherein any of these are unsubstituted or substituted by one or more alkyl, alkenyl, alkynyl, haloalkyl, —NO$_2$, —NR$_{10}$R$_{11}$, —CN, —OR$_{12}$, —SR$_{12}$, —C(O)R$_{13}$, —C(O)OR$_{14}$, or halogen groups, a radical of the formula N(R$_7$)(R$_6$)—CH(R$_5$)—N(R$_4$)—C(R$_2$)(R$_3$)—, or a combination thereof;

R$_2$ and R$_3$ each are independently selected from hydrogen, alkyl, or phenyl that is unsubstituted or is substituted by one or more times by alkyl, CN, —OR$_{12}$, —SR$_{12}$, halogen, or haloalkyl;

R$_5$ is alkyl or —NR$_8$R$_9$;

R$_4$, R$_6$, R$_7$, R$_8$, R$_9$, R$_{10}$, R$_{11}$, R$_{12}$, R$_{13}$, and R$_{14}$ are each independently hydrogen or alkyl; or R$_4$ and R$_6$ together form a C$_2$-C$_6$ alkylene bridge that is unsubstituted or substituted by one or more alkyl groups having up to four carbon atoms; or R$_5$ and R$_7$, independently of R$_4$ and R$_6$, together form a C$_2$-C$_6$ alkylene bridge that is unsubstituted or is substituted by one or more alkyl groups having up to four carbon atoms; or if R$_5$ is —NR$_8$R$_9$, R$_7$ and R$_9$ together form a C$_2$-C$_6$ alkylene bridge that is unsubstituted or substituted by one or more alkyl groups having up to four carbon atoms.

In a nineteenth embodiment, the present disclosure provides the composition of any one of the first to eighteenth embodiments, wherein the second amine is a solid within the composition.

In a twentieth embodiment, the present disclosure provides the composition of any one of the first to eighteenth embodiments, wherein the second amine is segregated within a solid in the composition.

In a twentieth embodiment, the present disclosure provides the composition of the nineteenth embodiment, wherein the solid is a semi-crystalline polymer.

In a twenty-first embodiment, the present disclosure provides the composition of any one of the first to twentieth embodiments, wherein the polythiol is monomeric.

In a twenty-second embodiment, the present disclosure provides the composition of any one of the first to twentieth embodiments, wherein the polythiol is oligomeric or polymeric.

In a twenty-third embodiment, the present disclosure provides the composition of the twenty-second embodiment, wherein the polythiol is a polythioether.

In a twenty-fourth embodiment, the present disclosure provides the composition of the twenty-third embodiment, wherein the polythiol is an oligomer or polymer prepared from components comprising a dithiol and a diene or divinyl ether.

In a twenty-fifth embodiment, the present disclosure provides the composition of the twenty-second embodiment, wherein the polythiol is a polysulfide oligomer or polymer.

In a twenty-sixth embodiment, the present disclosure provides the composition of the twenty-fifth embodiment, further comprising an oxidizing agent.

In a twenty-seventh embodiment, the present disclosure provides the composition of the twenty-sixth embodiment, wherein the oxidizing agent comprises at least one of calcium dioxide, manganese dioxide, zinc dioxide, lead dioxide, lithium peroxide, sodium perborate hydrate, sodium dichromate, or an organic peroxide.

In a twenty-eighth embodiment, the present disclosure provides the composition of any one of the first to twenty-seventh embodiments, further comprising filler.

In a twenty-ninth embodiment, the present disclosure provides the composition of the twenty-eighth embodiment, wherein the filler comprises at least one of silica, carbon black, calcium carbonate, aluminum silicate, or lightweight particles having a density of up to 0.7 grams per cubic centimeter.

In a thirtieth embodiment, the present disclosure provides the composition of any one of the first to twenty-ninth embodiments, wherein the polyepoxide is monomeric.

In a thirty-first embodiment, the present disclosure provides the composition of any one of the first to twenty-ninth embodiments, wherein the polyepoxide is oligomeric or polymeric.

In a thirty-second embodiment, the present disclosure provides the composition of any one of the first to thirty-first embodiments, wherein the polyepoxide is aromatic.

In a thirty-third embodiment, the present disclosure provides the composition of any one of the first to thirty-first embodiments, wherein the polyepoxide is non-aromatic.

In a thirty-fourth embodiment, the present disclosure provides the composition of any one of the first to thirty-third embodiments, wherein the polyepoxide comprises three or more epoxide groups.

In a thirty-fifth embodiment, the present disclosure provides the composition of any one of the first to thirty-fourth embodiments, further comprising a photosensitizer.

In a thirty-sixth embodiment, the present disclosure provides the composition of the thirty-fifth embodiment, wherein the photosensitizer has an absorbance in at least one of an ultraviolet A or blue light range.

In a thirty-seventh embodiment, the present disclosure provides the composition of the thirty-sixth embodiment, wherein the photosensitizer has an absorbance in the blue light range.

In a thirty-eighth embodiment, the present disclosure provides the composition of any one of the first to thirty-seventh embodiments, wherein the composition has an open time of at least ten minutes.

In a thirty-ninth embodiment, the present disclosure provides the composition of any one of the first to thirty-eighth embodiments, wherein the composition is essentially free of Michael acceptors.

In a fortieth embodiment, the present disclosure provides a polymer network preparable from the composition of any one of the first to thirty-ninth embodiments, wherein at least some of the thiol groups and epoxide groups have reacted to form thioether groups and hydroxyl groups.

In a forty-first embodiment, the present disclosure provides a sealant comprising the polymer network of the fortieth embodiment.

In a forty-second embodiment, the present disclosure provides a method of making an at least partially crosslinked polymer network, the method comprising:
providing the composition of any one of the first to thirty-ninth embodiments;
and at least one of:
exposing the composition to light to generate the first amine to at least partially cure the composition; or
allowing the composition to achieve a temperature sufficient for the second amine to at least partially cure the composition.

In a forty-third embodiment, the present disclosure provides a method of making an at least partially crosslinked polymer network, the method comprising:
providing the composition of any one of the eighth to thirty-ninth embodiments;
and at least one of:
exposing the composition to light to generate the first amine to at least partially cure the composition; or
allowing the composition to achieve a temperature sufficient for at least one of the second amine or the third amine to at least partially cure the composition.

In a forty-fourth embodiment, the present disclosure provides the method of the forty-second or forty-third embodiment, wherein the method includes exposing the composition to light.

In a forty-fifth embodiment, the present disclosure provides the method of the forty-fourth embodiment, wherein exposing the composition to light comprises exposing the composition to a light source that allows the composition to achieve a temperature sufficient for the second amine to at least partially cure the composition.

In a forty-sixth embodiment, the present disclosure provides the method of the forty-fifth embodiment, wherein the second amine is a solid, and wherein the temperature is sufficient to melt the solid.

In a forty-seventh embodiment, the present disclosure provides the method of the forty-fifth embodiment, wherein the second amine is segregated within a solid in the composition, wherein the solid is polymer with crystalized side chains, and wherein the temperature is sufficient to melt the side chains.

In a forty-eighth embodiment, the present disclosure provides the method of any one of the forty-second to forty-seventh embodiments, wherein exposing the composition to light to at least partially cure the composition comprises forming at least a non-tacky surface.

In a forty-ninth embodiment, the present disclosure provides the method of any one of the forty-second to forty-eighth embodiments, wherein exposing the composition to light to at least partially cure the composition comprises at least partially gelling the composition.

In a fiftieth embodiment, the present disclosure provides the method of any one of the forty-second to forty-ninth embodiments, wherein exposing the composition to light to at least partially cure the composition comprises fully curing the composition.

In a fifty-first embodiment, the present disclosure provides a method of making the composition of any one of the first to thirty-ninth embodiments, the method comprising:
providing a starting composition comprising the polythiol comprising more than one thiol group, the polyepoxide comprising more than one epoxide group, and the second amine that is phase-separated within the composition; and
applying a solution comprising the photolatent base catalyst to a surface of the starting composition.

In a fifty-second embodiment, the present disclosure provides the method of the fifty-first embodiment, further comprising allowing the solution to penetrate into the starting composition.

In a fifty-third embodiment, the present disclosure provides the method of the fifty-first or fifty-second embodiment, wherein applying comprises spraying the solution.

In a fifty-fourth embodiment, the present disclosure provides the method of any one of the fifty-first to fifty-third embodiments, wherein the solution further comprises a photosensitizer.

In a fifty-fifth embodiment, the present disclosure provides the method of the fifty-fourth embodiment, wherein the photosensitizer has an absorbance in at least one of a ultraviolet A or blue light range.

In a fifty-sixth embodiment, the present disclosure provides the method of the fifty-fourth embodiment, wherein the photosensitizer has an absorbance in the blue light range.

In a fifty-seventh embodiment, the present disclosure provides the method of any one of the fifty-first to fifty-sixth embodiments, further comprising exposing the composition to light to generate the first amine to at least partially cure at least a portion of the composition.

In a fifty-eighth embodiment, the present disclosure provides the method of the fifty-seventh, forty-fifth, or forty-fourth embodiment, wherein the light comprises at least one of ultraviolet A light or blue light.

In a fifty-ninth embodiment, the present disclosure provides the method of the fifty-eighth embodiment, wherein the light comprises blue light.

In order that this disclosure can be more fully understood, the following examples are set forth. It should be understood that these examples are for illustrative purposes only, and are not to be construed as limiting this disclosure in any manner.

EXAMPLES

Unless otherwise noted, all reagents were obtained or are available from Sigma-Aldrich Company, St. Louis, Mo., or may be synthesized by known methods. Unless otherwise reported, all ratios are by weight percent.
The following abbreviations are used to describe the examples:
° C.: degrees Centigrade
° F.: degrees Fahrenheit
cm: centimeter
LED: light emitting diode
mL: milliliter
mg: milligram
min.: minute
mm: millimeter mmol: millimole
mW/cm$^2$: milliwatts per square centimeter
nm: nanometer
N: Newton
NMR: nuclear magnetic resonance
rpm: revolutions per minute
T$_g$: glass transition temperature
wrt: with respect to
wt %: weight percent Abbreviations for the materials used in the examples are as follows:

A200: A hydrophilic fumed silica, obtained under the trade designation "AEROSIL 200" from Evonik Industries AG, Essen, Germany.

Bn-DBU: A photobase generator, 8-benzyl-1,8-diazabicyclo [5.4.0]undecane, prepared as described below.

CGI90: Photolatent base obtained from BASF, Ludwigshafen, Germany

CPQ: Camphorquinone, a photosensitizer obtained from Sigma-Aldrich Company.

DABCO: A 33% by weight solution of 1,4-Diazabicyclo [2.2.2]octane in dipropylene glycol, obtained under the trade designation "DABCO 33-LV" from Air Products & Chemicals, Inc., Allentown, Pa.

DBU: 1,8-Diazabicyclo[5.4.0]undec-7-ene obtained from Sigma Aldrich Company.

DCOL: 1,4-Butanediol diglycidyl ether, obtained under the trade designation "DENACOL EX-214L" from Nagase America Corporation, New York, N.Y.

EtOAc: Ethyl acetate.

GE30: Trimethylolpropane triglycidylether, obtained under the trade designation "ERISYS GE-30" from Emerald Performance Materials Company.

IHCF: Iron(III) hexacyanoferrate(II), obtained from Sigma-Aldrich Company.

L7004: A side chain crystallizable polymer bound imidazole, obtained under the trade designation "LANDEC INTELIMER 7004" from Landec Corporation, Menlo Park, Calif.

L7024: A side chain crystallizable polymer encapsulated imidazole, obtained under the trade designation "LANDEC INTELIMER 7024" from Landec Corporation.

L7124: A side chain crystallizable polymer encapsulated imidazole, obtained under the trade designation "LANDEC INTELIMER 7124" from Landec Corporation.

LP33: A liquid polysulfide polymer, obtained under the trade designation "THIOKOL LP-33" from Toray Fine Chemicals Co., Ltd., Urayasu, Japan.

P101: A thermally triggered amine curative, obtained under the trade designation "EPICURE P-101" from Hexion, Inc., Columbus, Ohio.

PN23: A thermally triggered amine curative, obtained under the trade designation "AJICURE PN-23" from Ajinomoto Fine-Techno Co., Inc., Kawasaki, Japan.

SOCAL: A precipitated calcium carbonate, obtained under the trade designation "SOCAL 322" from Solvay Chemicals, Inc., Houston, Tex.

THF: Tetrahydrofuran.

Bn-DBU Synthesis

The photobase generator, 8-benzyl-1,8-diazabicyclo[5.4.0] undecane, prepared as follows:

Reduction Step:

In a 250 mL round-bottomed flask, 9.14 grams (60.0 mmol) DBU was dissolved in 60 mL THF at 21° C., after which 1.14 grams lithium aluminum hydride (30.0 mmol) was added portionwise over 5 minutes. An air-cooled reflux condenser was added onto the flask, and the resultant mixture was heated at gentle reflux under nitrogen atmosphere at approximately 65° C. for 12 hours. The mixture was then allowed to cool to 21° C., followed by addition via pipette of 1.2 grams deionized water, then 1.2 grams of a 10 wt % aqueous solution of sodium hydroxide, then another 3.6 grams deionized water. The resultant mixture was allowed to stir for 30 minutes, then filtered through a short plug of "CELITE" filter aid, washing with an additional 30 mL THF. The filtrate was concentrated under reduced pressure, resulting in 8.50 grams (92% yield) of the desired product as a clear, slightly yellow oil. NMR verified complete reduction of the DBU starting material, with clean formation of the reduced product.

Benzylation Step:

In a 250 mL round-bottomed flask, 3.99 grams (25.9 mmol) of the reduced product was dissolved in 15 mL THF (15 mL) at 21° C., after which 3.93 grams (38.8 mmol) was added. A solution of benzyl bromide (4.43 grams (25.9 mmol) in 15 mL THF) was added dropwise via addition funnel over 10 minutes, and the resultant solution stirred at 21° C. for 12 hours. The THF was then removed under reduced atmosphere, and the residue was partitioned between 50 mL deionized water and 50 mL EtOAc. The organic layer was dried over magnesium sulfate, filtered, and concentrated to a yellow oil. This oil was purified by passing it through a short column of silica gel, eluting with EtOAc. The eluent fractions containing the product were concentrated under reduced pressure, resulting in 3.56 grams (56% yield) Bn-DBU, a clear, slightly yellow oil. NMR verified the purity at greater than 95%.

Example 1

A curable sealant composition was prepared as follows. A 40-mL glass vial was charged with 10.0000 grams LP33, 0.4315 grams CPQ and 0.5623 grams CGI90. The vial was sealed, wrapped in aluminum foil, placed on a heated laboratory roller at 100° F. (37.8° C.) for 2 hours until the mixture dissolved and then cooled to 70° F. (21.1° C.). Separately, 0.1233 grams DABCO was added to a speed mixing jar. The contents of the vial were then transferred to the mixing jar. 1.2455 grams GE30, 1.0830 grams DCOL, 0.0970 grams IHCF, 0.5800 grams A200, 0.5677 grams PN23, and 4.8000 grams SOCAL were then added to the mixing jar. The contents were then speed mixed at 2000 rpm for 1 min until homogenous. The jar was then immediately quenched in an ice bath to prevent thermal curing.

Examples 2-11

Curable sealant compositions were prepared as generally described in Example 1, according to the amounts and components listed in Table 1. With respect to Examples 10 and 11, the heated roller mill mixing time was reduced from 2 hours to 1 hour at 100° F. (37.8° C.).

Example 12

5.0000 grams LP33 and 1.2500 grams GE30 were manually stirred in a speed mixing jar at 70° F. (21.1° C.), then blended at 2,000 rpm for 1 minute.

Example 13

The procedure generally described for preparing Example 12 was repeated, wherein 0.1880 PN23 was also added to the mixing jar.

Example 14

The procedure generally described for preparing Example 12 was repeated, wherein 0.1880 P101 was also added to the mixing jar.

TABLE 1

Composition (grams)

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| LP33 | 10.0000 | 10.0000 | 10.0000 | 10.0000 | 10.0000 | 10.0000 | 10.0000 | 10.0000 | 10.0000 | 21.2281 | 0 |
| CPQ | 0.4315 | 0.4315 | 0.4315 | 0.4315 | 0.4315 | 0.4315 | 0.4315 | 0.4315 | 0.4315 | 0 | 0.2632 |
| CGI90 | 0.5623 | 0.5623 | 0.5623 | 0.5623 | 0.5623 | 0.5623 | 0 | 0 | 0.5623 | 1.1937 | 0 |
| DABCO | 0.1233 | 0.1233 | 0.0411 | 0.1233 | 0.1233 | 0.1233 | 0.1233 | 0.1233 | 0.1233 | 0.2618 | 0 |
| GE30 | 1.2455 | 1.2455 | 1.2455 | 1.2455 | 1.2455 | 1.2455 | 1.2455 | 1.2455 | 1.2455 | 1.2500 | 0.7599 |
| EX-241L | 1.0830 | 1.0830 | 1.0830 | 1.0830 | 1.0830 | 1.0830 | 1.0830 | 1.0830 | 1.0830 | 0 | 0.6607 |
| IHCF | 0.0970 | 0.0970 | 0.0970 | 0.0970 | 0.0970 | 0.0970 | 0.0970 | 0.0970 | 0.0970 | 0 | 0.0592 |
| A200 | 0.5800 | 0.5800 | 0.5800 | 0.5800 | 0.5800 | 0.5800 | 0.5800 | 0.5800 | 0.5800 | 0.7174 | 0.1477 |
| PN23 | 0.5677 | 0.3785 | 0.5677 | 0 | 0 | 0 | 0.5677 | 0.5677 | 0 | 0.7853 | 0.1880 |
| SOCAL | 4.8000 | 4.8000 | 4.8000 | 4.8000 | 4.8000 | 4.8000 | 4.8000 | 4.8000 | 4.8000 | 10.1900 | 0 |
| L7004 | 0 | 0 | 0 | 0.5677 | 0 | 0 | 0 | 0 | 0 | 0 | 0 |
| L7024 | 0 | 0 | 0 | 0 | 0.5677 | 0 | 0 | 0 | 0 | 0 | 0 |
| L7124 | 0 | 0 | 0 | 0 | 0 | 0.5677 | 0 | 0 | 0 | 0 | 0 |
| Bn-DBU | 0 | 0 | 0 | 0 | 0 | 0 | 0.5623 | 0 | 0 | 0 | 0 |
| P101 | 0 | 0 | 0 | 0 | 0 | 0 | 0 | 0 | 0 | 0 | 0 |

Sealant Curing and Evaluations

The sealant compositions were cured according to one or more of the following regimens:

Curing in a Teflon Mold

The sealant composition was poured into a 2.0 by 0.5 by 0.25 inch (5.08 by 1.27 by 0.635 cm) Teflon™ mold at 70° F. (21.1° C.), whilst ensuring no air bubbles were present, and excess sealant removed by gently scraping the sample with a glass slide. The sealant was then cured according to one of the following methods, after which they were evaluated for Shore A Hardness, $T_g$, Elongation To Break and Tensile Strength.

a. Light Cure. The sealant was exposed to a 455 nm LED light, model "CT2000 LED", obtained from Clearstone Technologies, Inc., Hopkins, Minn., at approximately 160 mW/cm² for 1 minute at a distance of 2.25 inches (5.72 cm), followed by 4 minutes without irradiation. The sealant was then stored in the dark at 70° F. (21.1° C.) for 1 week.
  b. Thermal Cure. The sealant was placed in an oven at 212° F. (100° C.) for 1 minute, then stored in the dark at 70° F. (21.1° C.) for 1 week.
  c. Dark Cure Only. The sealant was stored in the dark at 70° F. (21.1° C.) for 1 week.

Curing on an Aluminum Panel

The sealant composition was carefully applied onto a 3 by 6 inch (7.62 by 15.24 cm) aluminum plate, at 70° F. (21.1° C.), to a bubble-free thickness of approximately 0.125 inches (3.18 mm) by means of a glass slide. The sealant was then cured by exposure to the 455 nm LED light at approximately 160 mW/cm² for 1 minute at a distance of 2.25 inches (5.72 cm), followed by 4 minutes without irradiation.

Qualitative Cure Rating

The sealant formulation was mixed in a small plastic cup and was allowed to sit at either 70° F. (21.1° C.) or 176° F. (80° C.) for a given amount of time, after which it was inspected to determine, qualitatively, the degree of curing as evidenced by the degree of solidification. The degree of curing was rated on a scale of 1-5, wherein 1 represented no change and 5 reflected complete cure to a tough gel.

FOD (Foreign Object Debris) Rating

After curing on an aluminum panel as described above, fine aluminum shavings were spread on to the cured sealant surface and allowed to remain undisturbed for 30 seconds at 70° F. (21.1° C.). The sealant was then inverted to allow the shavings to fall off, after which the sealant surface was gently brushed using a fine fiber paintbrush to remove any remaining aluminum shavings. The amount of aluminum shavings remaining after inversion and after brushing was rated on a scale of 1-5, wherein 1 represented FOD-free, akin to tack-free, if no aluminum shavings remained on the sealant surface, and a rating of 5 if there was a significant amount of retained shavings.

Skin Thickness

The skin of cured sealant from the aluminum panel described above, was removed from the sample and any excess uncured sealant removed by careful wiping. The thickness of the skin was then measured using a caliper.

Open Time

Open time refers to the approximate amount of time the sealant composition exhibits sufficient flow in order to completely wet out a surface when manually spread with a spatula at 21° C.

Tensile Strength and Elongation at Break

The sealant composition was spread into two 8.8 by 3.1 by 0.25 cm Teflon™ molds at 21° C. The first sample was allowed to cure in the dark for one week. The second sample was exposed to the 455 nm, CT-2000 lamp, at 50% power at a distance of approximately 1.5 cm for 1 minute, after which it was also allowed to cure in the dark for one week. The cured samples were then removed from the molds and 6.2 by 1.0 cm by 0.3 cm neck, dog-bone shaped specimens die-cut from the cured sample. Peak tensile strength and elongation were measured at a pull rate of 1-inch (2.54 cm)/min and a 400N load cell, using a model "INSTRON 5544" Tensile Strength Tester obtained from Instron Instruments, Norwood, Mass. Results reported herein represent an average of 3 cured samples per test.

Tg

The glass transition temperature Tg was determined using a model "Q-2000" Differential Scanning Calorimieter, obtained from TA Instruments, Inc., New Castle, Del. Test specimens were approximately 10 mg in TZero low mass pans with TZero lids. Equilibration was 5 minutes at −90° C. followed by a ramp at 10° C. per minute to 200° C. Data points were taken at 1 second intervals.

Shore A Hardness

Measured using a model "1600" hardness gauge, obtained from Rex Gauge Company, Inc., Buffalo Grove, Ill.

Evaluations of the various examples of the present invention are summarized in the following tables.

TABLE 2

| | | Example 1 | | |
|---|---|---|---|---|
| Teflon ™ Mold Cure | Shore A Hardness | $T_g$ (° C.) | Elongation (%) | Tensile Strength (psi/KPa) |
| Light Cure | 67 | −49.3 | 55 ± 7 | 240 ± 12 |
| Thermal Cure | 67 | −49.2 | 72 ± 7 | 273 ± 11 |
| Dark Cure Only | 67 | −49.0 | 68 ± 7 | 271 ± 3 |

TABLE 3

| Qualitative Cure Rating @ 70° F. (21.1° C.) | | |
|---|---|---|
| Example | @ 1.5 Hours | @ 5.5 Hours |
| 12 | 1 | 1 |
| 13 | 1 | 2 |
| 14 | 2 | 4 |

TABLE 4

| Qualitative Cure Rating @ 176° F. (80° C.) | | | | | | |
|---|---|---|---|---|---|---|
| Example | @ 1 min. | @ 5 mins. | @ 10 mins. | @15 mins. | @ 20 mins. | @ 35 mins. |
| 12 | 1 | 1 | 1 | 2 | 2 | 2 |
| 13 | 1 | 2 | 3 | 5 | 5 | 5 |
| 14 | 2 | 3 | 3 | 3 | 3 | 4 |

TABLE 5

| Example | Open Time (Hours) | Skin Thickness (inches/mm) |
|---|---|---|
| 3 | >2 | 0.024/0.61 |
| 4 | >2 | 0.010/0.25 |
| 5 | >2 | 0.080/0.20 |
| 6 | >2 | 0.010/0.25 |

TABLE 6

| | FOD Rating | | Skin Thickness |
|---|---|---|---|
| Example | After Inversion | After Brushing | (inches/mm) |
| 1 | 2 | 1 | 0.125/0.32 |
| 7 | 3 | 1 | Not Measured |
| 8 | 4 | 3 | 0 |
| 9 | 2 | 1 | 0.036/0.09 |

TABLE 7

| Example | Wt. % DABCO (wrt resin) | Wt. % PN23 (wrt resin) | Open Time (Hours) | Skin Thickness (inches/mm) |
|---|---|---|---|---|
| 1 | 1.0 | 3.0 | 1.25 | 0.125/0.32 |
| 2 | 1.0 | 2.0 | 1.45 | 0.045/0.11 |
| 3 | 0.33 | 3.0 | >2.0 | 0.024/0.61 |

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A composition comprising:
   a polythiol comprising more than one thiol group,
   a polyepoxide comprising more than one epoxide group,
   a photolatent base, wherein the photolatent base can photochemically generate a first amine, and
   a second amine that is phase-separated within the composition.

2. The composition of claim 1, wherein the first amine and the second amine are different amines.

3. The composition of claim 1, further comprising a third amine that is not phase-separated.

4. The composition of claim 3, wherein the first amine, the second amine, and the third amine are different amines.

5. The composition of claim 1, wherein the first amine and second amine are each independently a tertiary amine, an amidine, or a guanidine.

6. The composition of claim 1, wherein at least one of the first amine or second amine comprises at least one of tetramethylguanidine, diphenylguanidine, 1,4-diazabicyclo[2.2.2]octane, 1,8-diazabicyclo[5.4.0]undec-7-ene, or 1,5-diazabicyclo[4.3.0]non-5-ene.

7. The composition of claim 1, wherein the photolatent base is represented by formula:

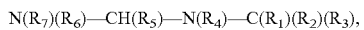

wherein
   $R_1$ is selected from phenyl, naphthyl, phenanthryl, anthryl, pyrenyl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, anthraquinonyl, dibenzofuryl, chromenyl, xanthenyl, thioxanthyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, terphenyl, stilbenyl, fluorenyl, phenoxazinyl, and combinations thereof, wherein any of these are unsubstituted or substituted by one or more alkyl, alkenyl, alkynyl, haloalkyl, —$NO_2$, —$NR_{10}R_{11}$, —CN, —$OR_{12}$, —$SR_{12}$, —$C(O)R_{13}$, —$C(O)OR_{14}$, or halogen groups, a radical of the formula $N(R_7)(R_6)$—$CH(R_5)$—$N(R_4)$—$C(R_2)(R_3)$—, or a combination thereof;

$R_2$ and $R_3$ each are independently selected from hydrogen, alkyl, or phenyl that is unsubstituted or is substituted by one or more times by alkyl, CN, —$OR_{12}$, —$SR_{12}$, halogen, or haloalkyl;

$R_5$ is alkyl or —$NR_8R_9$;

$R_4$, $R_6$, $R_7$, $R_8$, $R_9$, $R_{10}$, $R_{11}$, $R_{12}$, $R_{13}$, and $R_{14}$ are each independently hydrogen or alkyl; or $R_4$ and $R_6$ together form a $C_2$-$C_6$ alkylene bridge that is unsubstituted or substituted by one or more alkyl groups having up to four carbon atoms; or $R_5$ and $R_7$, independently of $R_4$ and $R_6$, together form a $C_2$-$C_6$ alkylene bridge that is unsubstituted or is substituted by one or more alkyl groups having up to four carbon atoms; or if $R_5$ is —$NR_8R_9$, $R_7$ and $R_9$ together form a $C_2$-$C_6$ alkylene bridge that is unsubstituted or substituted by one or more alkyl groups having up to four carbon atoms.

8. The composition of claim 1, wherein the second amine is a solid within the composition.

9. The composition of claim 1, wherein the second amine is segregated within a solid within the composition.

10. The composition of claim 1, wherein the polythiol is monomeric.

11. The composition of claim 1, wherein the polythiol is an oligomeric or polymeric polythioether or polysulfide.

12. The composition of claim 1, wherein the polyepoxide is an oligomeric or polymeric epoxy resin.

13. The composition of claim 1, further comprising a photosensitizer.

14. A polymer network preparable from the composition of claim 1, wherein at least some of the thiol groups and epoxide groups have reacted to form thioether groups and hydroxyl groups.

15. A method of making a polymer network, the method comprising:
   providing the composition of claim 1;
   and at least one of:
      exposing the composition to light to generate the first amine to at least partially cure the composition; or
      allowing the composition to achieve a temperature sufficient for the second amine to at least partially cure the composition.

16. The composition of claim 11, wherein the polythiol is an oligomeric or polymeric polythioether prepared from components comprising a dithiol and a diene or divinyl ether.

17. The composition of claim 9, wherein the solid is a semi-crystalline polymer.

18. The composition of claim 3, wherein at least one of the first amine or second amine has a higher conjugate acid pKa than the third amine.

19. The composition of claim 3, wherein the third amine is 1,4-diazabicyclo[2.2.2]octane.

20. The composition of claim 1, further comprising filler.

* * * * *